(12) United States Patent
Fermer et al.

(10) Patent No.: US 10,343,634 B1
(45) Date of Patent: Jul. 9, 2019

(54) EXTENDABLE BUMPERS FOR VEHICLES

(71) Applicants: Erik Mikael Fermer, Sunnyvale, CA (US); Alice C. Watts, Cupertino, CA (US); Joel Frederic Jensen, Sunnyvale, CA (US); Ronald Jack Smith, Sunnyvale, CA (US); Mark B. Rober, Cupertino, CA (US); Sung Hoon Kim, Sunnyvale, CA (US); David Jennings Dostal, Sunnyvale, CA (US); Russell Cranstoun Mead, Jr., Sunnyvale, CA (US); Todd Elliot Lewis, Sunnyvale, CA (US); Jesse T. Buehler, Los Altos, CA (US); Nathaniel J. Dennis, Cupertino, CA (US); Tommaso P. Rivellini, Sunnyvale, CA (US); Robert R. Mayer, Pleasanton, CA (US); Anthony S. Montevirgen, San Francisco, CA (US); Donald J. Parr, Mountain View, CA (US); Bryce A. Woollard, Carpentersville, IL (US); Adam J. Golman, Cupertino, CA (US); Kevin P. Makowski, Simi Valley, CA (US); Daniel E. Rivera, San Jose, CA (US)

(72) Inventors: Erik Mikael Fermer, Sunnyvale, CA (US); Alice C. Watts, Cupertino, CA (US); Joel Frederic Jensen, Sunnyvale, CA (US); Ronald Jack Smith, Sunnyvale, CA (US); Mark B. Rober, Cupertino, CA (US); Sung Hoon Kim, Sunnyvale, CA (US); David Jennings Dostal, Sunnyvale, CA (US); Russell Cranstoun Mead, Jr., Sunnyvale, CA (US); Todd Elliot Lewis, Sunnyvale, CA (US); Jesse T. Buehler, Los Altos, CA (US); Nathaniel J. Dennis, Cupertino, CA (US); Tommaso P. Rivellini, Sunnyvale, CA (US); Robert R. Mayer, Pleasanton, CA (US); Anthony S. Montevirgen, San Francisco, CA (US); Donald J. Parr, Mountain View, CA (US); Bryce A. Woollard, Carpentersville, IL (US); Adam J. Golman, Cupertino, CA (US); Kevin P. Makowski, Simi Valley, CA (US); Daniel E. Rivera, San Jose, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 15/418,208

(22) Filed: Jan. 27, 2017

Related U.S. Application Data

(60) Provisional application No. 62/287,499, filed on Jan. 27, 2016.

(51) Int. Cl.
*B60R 19/38* (2006.01)
*B60R 19/34* (2006.01)

(52) U.S. Cl.
CPC ............ *B60R 19/38* (2013.01); *B60R 19/34* (2013.01)

(58) Field of Classification Search
CPC .................................. B60R 19/38; B60R 19/34
(Continued)

(56) References Cited

U.S. PATENT DOCUMENTS

| 1,504,679 A | 8/1924 | Dietz |
| 1,754,104 A | 4/1930 | Hoffman |

(Continued)

FOREIGN PATENT DOCUMENTS

| DE | 4113031 A1 | 10/1992 |
| DE | 1414432 A1 | 11/1995 |

(Continued)

*Primary Examiner* — Jason S Morrow
*Assistant Examiner* — E Turner Hicks
(74) *Attorney, Agent, or Firm* — Young Basile Hanlon & MacFarlane, P.C.

(57) ABSTRACT

An apparatus includes a vehicle structure, a bumper, an elongate structural member, and an extension portion. The
(Continued)

elongate structural member is able to crush longitudinally in response to application of force in a longitudinal direction. The extension portion is able to crush longitudinally in response to application of force in the longitudinal direction, is connected to the elongate structural member such that the elongate structural member and the extension portion support the bumper with respect to the vehicle structure, and is operable to move the bumper between an extended position and a retracted position with respect to the vehicle structure to change a distance between the bumper and the vehicle structure.

20 Claims, 28 Drawing Sheets

(58) Field of Classification Search
USPC ............ 293/118, 119, 155, 9, 10, 24, 25, 26
See application file for complete search history.

(56) References Cited

U.S. PATENT DOCUMENTS

| | | | |
|---|---|---|---|
| 3,355,208 A | 11/1967 | Brock | |
| 3,488,077 A | 1/1970 | Miller | |
| 3,655,231 A | 4/1972 | Killea, Jr. | |
| 3,834,483 A | 9/1974 | Palmer | |
| 3,947,061 A | 3/1976 | Ellis | |
| 4,061,386 A | 12/1977 | Chupick | |
| 4,227,729 A * | 10/1980 | Schumacher | B60R 19/46 224/509 |
| 4,411,334 A | 10/1983 | Schlanger | |
| 4,641,871 A | 2/1987 | Vaughn | |
| 4,700,977 A | 10/1987 | Hlavach | |
| 4,830,417 A | 5/1989 | Bates et al. | |
| 4,830,418 A | 5/1989 | Gest | |
| 4,932,697 A | 6/1990 | Hun | |
| 5,011,205 A | 4/1991 | Liu | |
| 5,370,429 A | 12/1994 | Reuber et al. | |
| 5,810,427 A * | 9/1998 | Hartmann | B60R 19/40 280/742 |
| 5,967,573 A | 10/1999 | Wang | |
| 6,343,821 B2 | 2/2002 | Breed | |
| 6,575,509 B1 * | 6/2003 | Golden | B60R 9/06 293/106 |
| 6,709,035 B1 | 3/2004 | Namuduri et al. | |
| 6,773,044 B2 | 8/2004 | Schambre et al. | |
| 6,834,898 B2 | 12/2004 | Wang et al. | |
| 6,910,558 B2 | 6/2005 | Wang et al. | |
| 7,347,465 B2 | 3/2008 | Jayasuriya et al. | |
| 7,909,373 B2 * | 3/2011 | Donovan | B60R 19/40 293/118 |
| 8,113,555 B2 | 2/2012 | Faruque | |
| 2002/0096894 A1 * | 7/2002 | Breed | B60R 19/00 293/119 |
| 2003/0165356 A1 * | 9/2003 | Breed | B60R 19/00 404/6 |
| 2008/0048461 A1 | 2/2008 | Jayasuriya et al. | |
| 2009/0058109 A1 * | 3/2009 | Mattschull | B60R 19/14 293/102 |
| 2011/0260477 A1 | 10/2011 | Martin et al. | |
| 2015/0224949 A1 | 8/2015 | Cuddihy et al. | |

FOREIGN PATENT DOCUMENTS

| | | |
|---|---|---|
| DE | 4414432 A1 | 11/1995 |
| DE | 19905784 A1 | 9/1999 |
| DE | 10313296 A1 | 10/2003 |
| DE | 102010017885 B4 | 6/2013 |
| DE | 102013106284 A1 | 12/2014 |
| EP | 1123468 B1 | 1/2004 |
| EP | 2692589 A1 | 2/2014 |
| WO | 9209456 A1 | 6/1992 |
| WO | 9531355 A1 | 11/1995 |

* cited by examiner

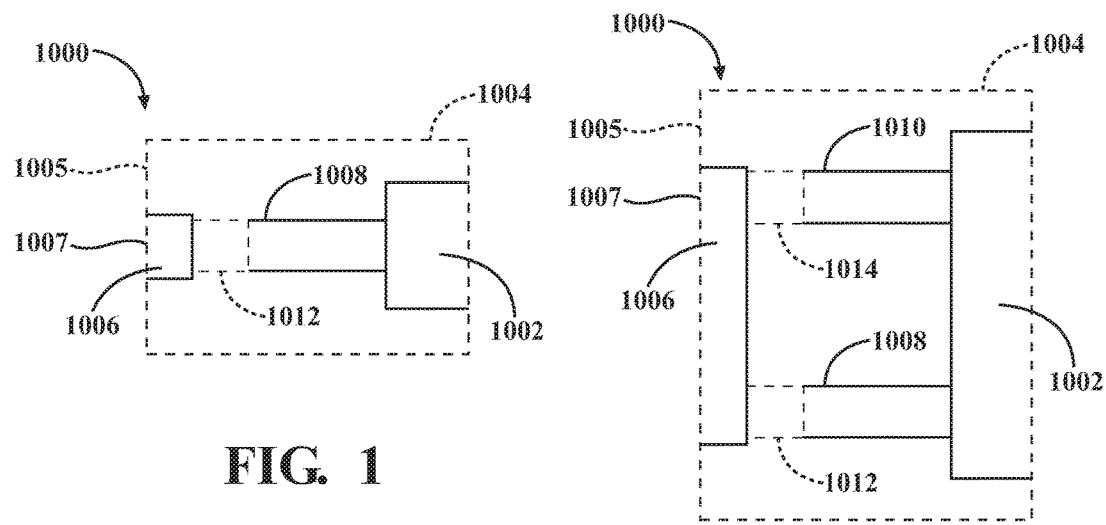
FIG. 1
FIG. 2
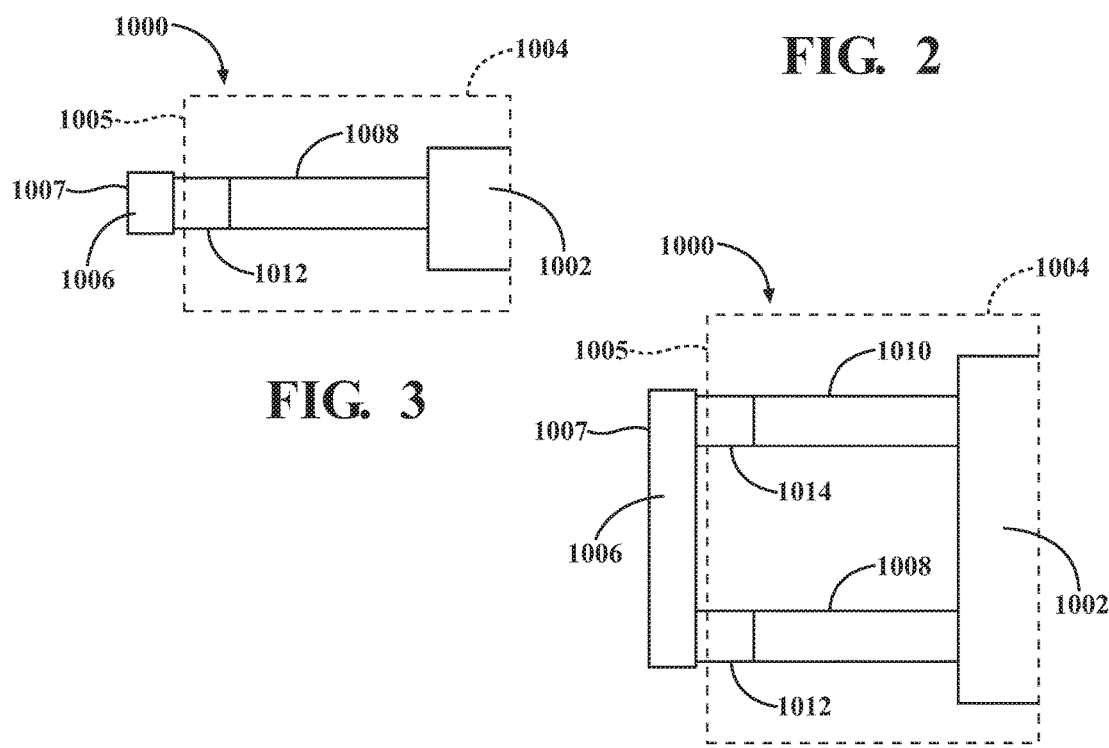
FIG. 3
FIG. 4

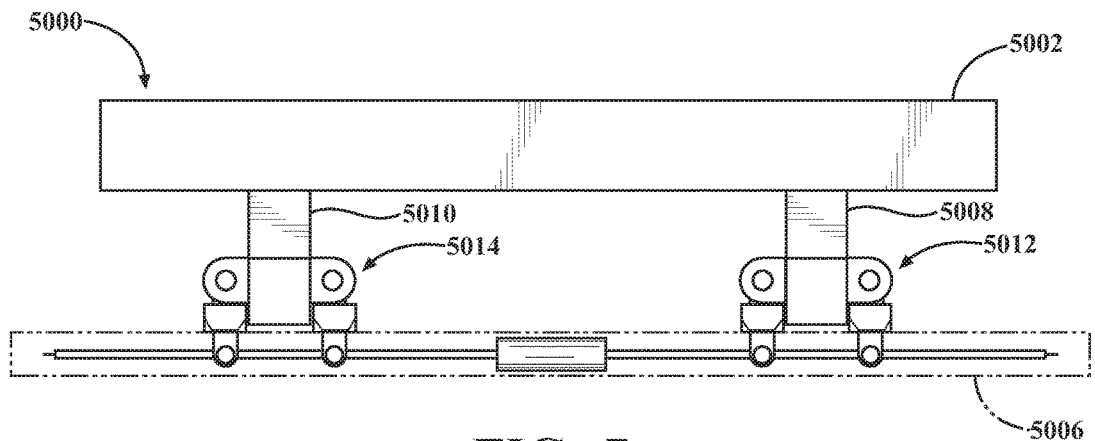
FIG. 7
FIG. 8
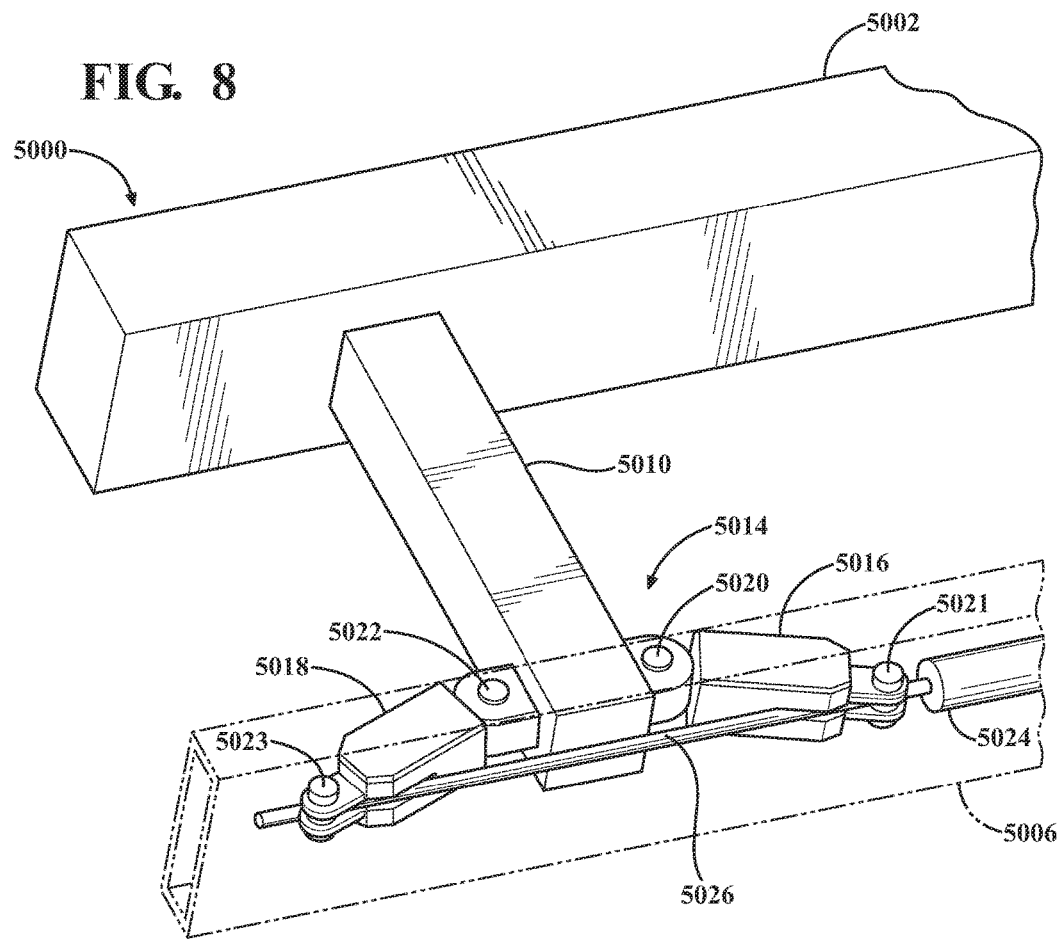

EXTENDABLE BUMPERS FOR VEHICLES

CROSS-REFERENCE TO RELATED APPLICATIONS

This application claims the benefit of U.S. Provisional Application No. 62/287,499, filed on Jan. 27, 2016, the content of which is hereby incorporated by reference in its entirety for all purposes.

FIELD

The disclosure relates generally to the field of vehicle body structures.

BACKGROUND

In the automotive field, bumpers are vehicle structures that are typically positioned at the front and rear of the vehicle. Functions performed by bumpers include preventing damage to other portions of the vehicle during a low-speed collision, absorbing energy during higher speed collisions, and reducing the extent of height mismatch between vehicles of different sizes.

Bumpers often protrude longitudinally forward with respect to other vehicle structures such as body panels, or longitudinally rearward of other vehicle structures. In the event of a collision at the front or rear of a vehicle, the bumper is often the first part of the vehicle that is struck. A number of vehicle bumper structures have been utilized. A simple design includes a laterally extending metal beam that is supported forward of other vehicle structures by two or more support structures. Many modern designs include a plastic bumper cover that conceals an underlying bumper structure that is designed to absorb impact by crushing, such as a cellular structure formed from plastic.

SUMMARY

One aspect of the disclosure is an apparatus that includes a vehicle structure, a bumper, an elongate structural member, and an extension portion. The elongate structural member is able to crush longitudinally in response to application of force in a longitudinal direction. The extension portion is able to crush longitudinally in response to application of force in the longitudinal direction, is connected to the elongate structural member such that the elongate structural member and the extension portion support the bumper with respect to the vehicle structure, and is operable to move the bumper between an extended position and a retracted position with respect to the vehicle structure to change a distance between the bumper and the vehicle structure.

Another aspect of the disclosed embodiments is an apparatus that includes a vehicle structure, a bumper, a first side rail, and an extension assembly. The first side rail extends longitudinally and is located between the vehicle structure and the bumper. The extension assembly is connected to the first side rail to support the bumper with respect to the vehicle structure and is operable to move the bumper between an extended position and a retracted position with respect to the vehicle structure to change a distance between the bumper and the vehicle structure. The extension assembly includes a piston and a cylinder, and the cylinder is operable to move the piston with respect to the cylinder to cause movement of the bumper between the extended position and the retracted position.

Another aspect of the disclosed embodiments is an apparatus that includes a bumper, a vehicle structure that supports the bumper, a crush member that is configured to resist movement of the bumper toward the vehicle structure and absorb energy by crushing, and a connecting portion that connects the bumper to the crush member to allow transmission of force from the bumper to the crush member.

Another aspect of the disclosed embodiments is an apparatus that includes a vehicle structure, a bumper that is supported by the vehicle structure, and a crush member that is configured to absorb energy that is applied to the bumper by expelling a crush material from inside the crush member.

BRIEF DESCRIPTION OF THE DRAWINGS

FIG. 1 is a side view illustration showing an extendable bumper system according to a first example in a retracted position.

FIG. 2 is a top view illustration showing the extendable bumper system according to the first example in the retracted position.

FIG. 3 is a side view illustration showing the extendable bumper system according to the first example in an extended position.

FIG. 4 is a top view illustration showing the extendable bumper system according to the first example in the extended position.

FIG. 7 is a top view illustration showing the extendable bumper system according to the second example in a crushed condition.

FIG. 8 is a perspective view illustration showing the extendable bumper system according to the second example in a retracted condition.

DETAILED DESCRIPTION

Figure 5:
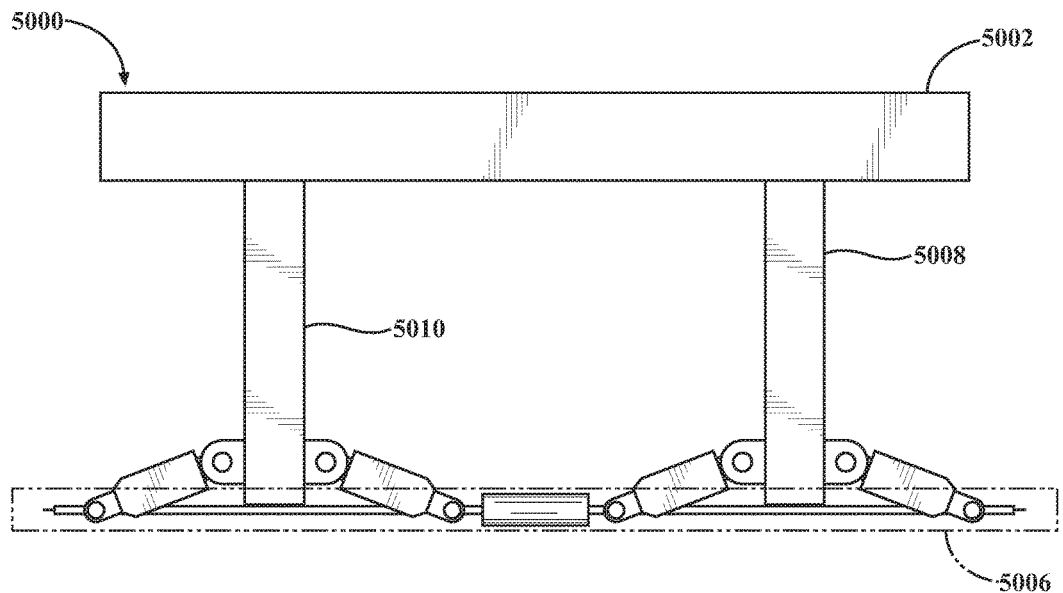
FIG. 5 is a top view illustration showing an extendable bumper system according to a second example in a retracted position.

This disclosure relates to extendable bumper systems for vehicles. The extendable bumper systems described herein are configured to move one or both of the front and rear bumpers of a vehicle between a retracted position and an extended position, with the overall length of the vehicle being increased when the bumpers are in the extended position as compared to the retracted position. In some implementations, the extendable bumper systems also include crushable members that absorb energy during an impact.

FIGS. 1-4 show an extendable bumper system 1000 for a vehicle that includes a vehicle structure 1002 and a body portion 1004. The vehicle structure 1002 in this example can be an internal structural member of the vehicle that supports the body portion 1004 and can support other portions of the vehicle such as suspension components and drivetrain components. As examples, the vehicle structure 1002 can be all of or a portion of a frame, a subframe, a unibody, or a monocoque. The body portion 1004 can be an external panel of the vehicle. The body portion 1004 can be a unitary part or can be an assembly of multiple parts. In the illustrated example, the body portion 1004 is positioned at the longitudinal front of the vehicle.

At least a portion of the extendable bumper system 1000 is able to move between a retracted position (FIGS. 1-2) and an extended position (FIGS. 3-4). For example, the extendable bumper system 1000 includes a bumper 1006. The bumper 1006 is an elongate structure that extends laterally across a majority of a width of the vehicle. In the illustrated example, the body portion has a front surface 1005, and the bumper has a front surface 1007. In the retracted position, the front surface 1007 of the bumper 1006 is substantially aligned with the front surface 1005 of the body portion 1004. In the extended position, the bumper 1006 has moved longitudinally forward with respect to the body portion 1004 such that the front surface 1007 of the bumper 1006 is disposed longitudinally forward of the front surface 1005 of the body portion 1004, and the front surface 1007 of the bumper 1006 is no longer aligned with the front surface 1005 of the body portion 1004.

To support the bumper 1006, the extendable bumper system 1000 includes a first side rail 1008 and a second side rail 1010 that are spaced laterally with respect to one another. The first side rail 1008 and the second side rail 1010 are each elongate structural members that are able to crush longitudinally in response to application of force in the longitudinal direction, such as in response to an impact. For example, the first side rail and the second side rail may be elongate beams or frame rails that extend in the longitudinal direction of the vehicle from the vehicle structure 1002 toward the bumper 1006. The first side rail 1008 and the second side rail 1010 can be made of any suitable material. As one example, the first side rail 1008 and the second side rail 1010 may each be fabricated from steel. As another example, the first side rail 1008 and the second side rail 1010 may each be fabricated from aluminum. In some implementations the first side rail 1008 and the second side rail 1010 are hollow members, such as tubular structures or extruded structures with one or more internal cavities that extend longitudinally through them. The first side rail 1008 and the second side rail 1010 may be configured to absorb energy during an impact, such as by crushing such that their respective longitudinal lengths are decreased during the impact.

To move the bumper 1006 between the retracted position and the extended position, the extendable bumper system 1000 includes a first extension portion 1012 and a second extension portion 1014. The first extension portion 1012 is connected to the first side rail 1008 and to the bumper 1006. The second extension portion 1014 is connected to the second side rail 1010 and to the bumper 1006. The first extension portion 1012 and the second extension portion 1014 are connected to the bumper 1006 at laterally spaced locations, such as by being positioned adjacent to respective lateral ends of the bumper 1006.

In the illustrated example, the first extension portion 1012 and the second extension portion 1014 each have a lengthwise (i.e., longitudinal) overlap with respect to the first side rail 1008 and the second side rail 1010, respectively, in the retracted position. The first extension portion 1012 and the second extension portion 1014 move with respect to the first side rail 1008 and the second side rail 1010 toward the extended position in a manner that reduces the extent of the lengthwise overlap of the first and second extension portions 1012, 1014 with respect to the first and second side rails 1008, 1010. This causes an increase in the overall effective length of the extendable bumper system 1000.

To allow for lengthwise overlap and longitudinal motion, the first extension portion 1012 and the second extension portion 1014 can be mounted to the first side rail 1008 and the second side rail 1010 such that they are longitudinally slidable. Suitable structures include, as examples, telescopically-related beams and side-by-side beams that are connected by sliding bearings. Additional examples of suitable structures will be discussed herein.

In order to cause movement of the bumper 1006 between the retracted position and the extended position, the first extension portion 1012 and the second extension portion 1014 can each include an actuator. Suitable actuators include electric motors, pneumatic piston-cylinder devices, and hydraulic piston-cylinder devices. Operation of such actuators can be performed by incorporating the extendable bumper system 1000 in a system that includes an electronic control unit (not shown). The electronic control unit can control operation of the extendable bumper system 1000 using one or more operating methods. In such implementations, for example, the electronic control unit can cause movement of the bumper 1006 between the retracted and extended positions in response to a predetermined criterion being satisfied. As one example, the electronic control unit can cause the bumper 1006 to be moved from the retracted position to the extended position when the vehicle is started and can cause the bumper 1006 to return to the retracted position when the vehicle is stopped. As another example, the electronic control unit can cause the bumper 1006 to move from the retracted position to the extended position when a speed of the vehicle exceeds a threshold speed and can cause the bumper 1006 to return to the retracted position when the speed of the vehicle drops below the threshold speed. As another example, the electronic control unit can cause the bumper 1006 to move from the retracted position to the extended position in response to detecting an imminent collision.

The extendable bumper system 1000 may include a locking mechanism that is operable, when engaged, to prevent movement of first and second extension portions 1012, 1014 relative to the first and second side rails 1008, 1010 from the extended position to the retracted position. As one example, mechanical means such as a pin that is associated with an actuator can be incorporated in the first and second extension portions 1012, 1014. As another example, the locking mechanism can be incorporated in the actuator that is included in or associated with the first and second extension portions 1012, 1014, such as structures or configurations that prevent back-driving of the actuator.

Additional implementations will be described herein that are similar to the extendable bumper system 1000 in structure and operation, except as otherwise noted.

Figure 6:
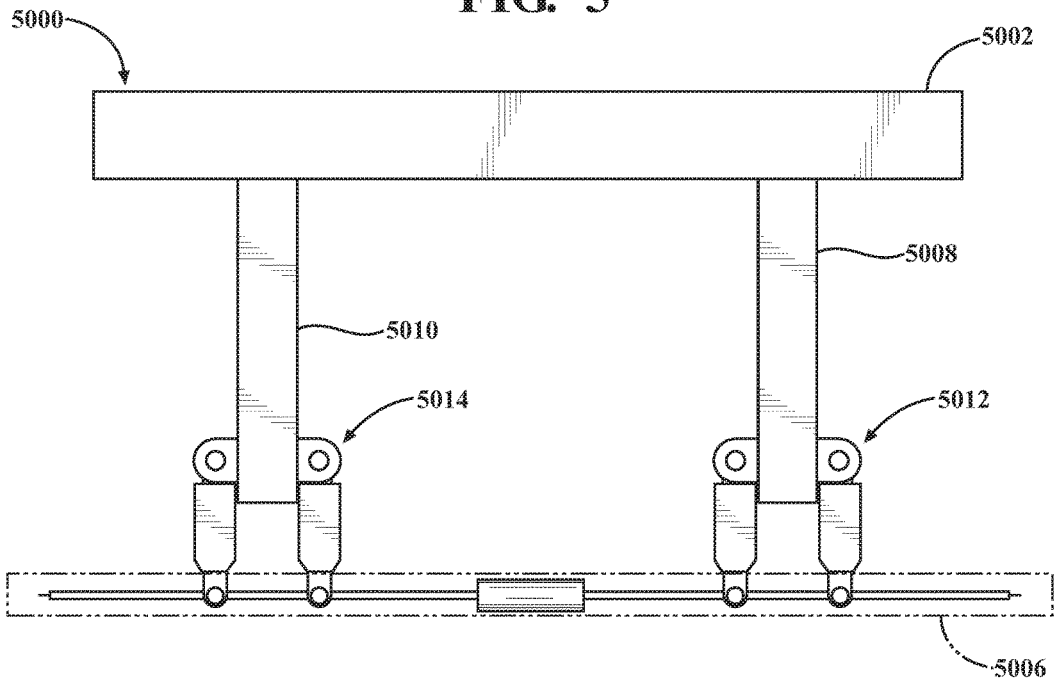
FIG. 6 is a top view illustration showing the extendable bumper system according to the second example in an extended position.
Figure 9:
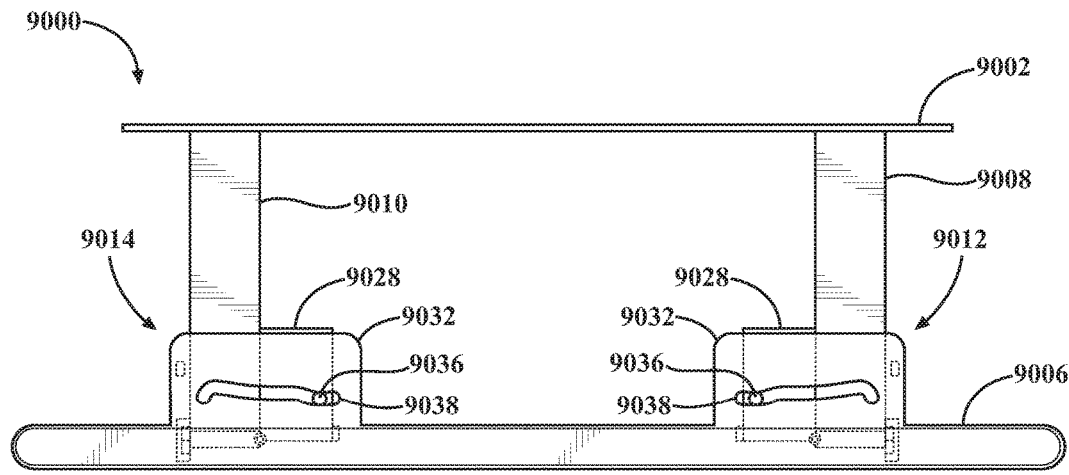
FIG. 9 is a top view illustration showing an extendable bumper system according to a third example in a retracted position.
Figure 10:
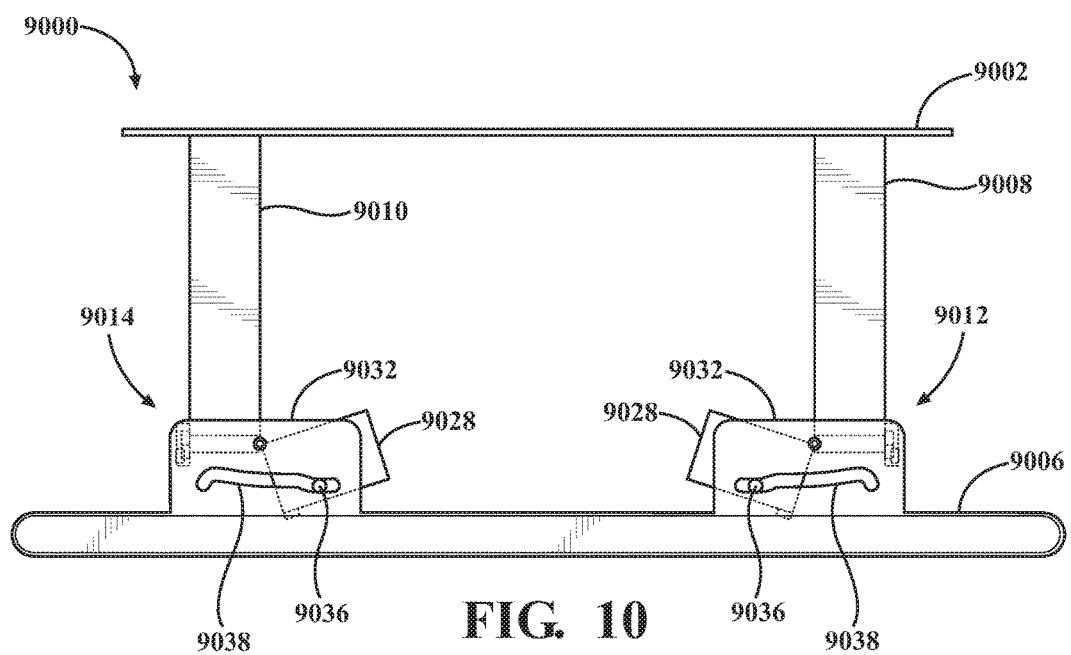
FIG. 10 is a top view illustration showing the extendable bumper system according to the third example in an intermediate position.
Figure 11:
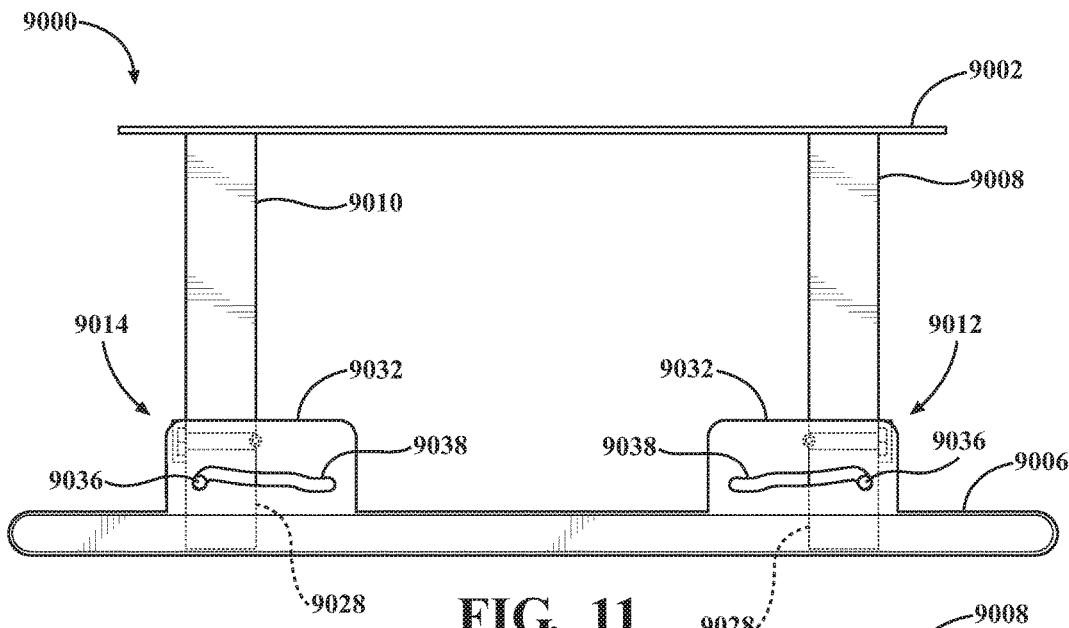
FIG. 11 is a top view illustration showing the extendable bumper system according to the third example in an extended position.

FIGS. 5-8 show an extendable bumper system 5000 in which a bumper 5006 is supported with respect to a vehicle structure 5002 by a first side rail 5008, a second side rail 5010, a first extension portion 5012, and a second extension portion 5014. The extendable bumper system 5000 is movable between a retracted position (FIG. 5) and an extended position (FIG. 6). During an impact, portions of the first side rail 5008, the second side rail 5010, the first extension portion 5012, and the second extension portion 5014 are crushable such that they collapse the overall length of the extendable bumper system 5000 relative to the extended position to define a collapsed condition (FIG. 7) for the extendable bumper system 5000.

The first extension portion 5012 and the second extension portion 5014 are similar to one another and will be described together with reference to the second extension portion 5014. As best seen in FIG. 8, the second extension portion 5014 includes a first pivot arm 5016 and a second pivot arm 5018. The first pivot arm 5016 extends from a first pivot joint 5020 to a second pivot joint 5021. The second pivot arm 5018 extends from a third pivot joint 5022 to a fourth pivot joint 5023. The first pivot arm 5016 and the second pivot arm 5018 are each pivotally connected to the second side rail 5010 by the first pivot joint 5020 and the third pivot joint 5022, respectively. The first pivot joint 5020 and the third pivot joint 5022 may be disposed on opposite sides of the second side rail 5010, such as on an inboard side and an outboard side of the second side rail 5010, respectively.

The first pivot joint 5020 and the second pivot joint 5021 can each be connected, either directly or indirectly, to an actuator. In the illustrated example, an actuator is provided in the form of an electric motor 5024 that is operable to rotate a lead screw 5026 in both clockwise and counter-clockwise directions. To connect the first pivot arm 5016 and the second pivot arm 5018 to the lead screw 5026, the second pivot joint 5021 and the fourth pivot joint 5023 can each incorporate a threaded connection to the lead screw 5026. The directions of movement of the second pivot joint 5021 and the fourth pivot joint 5023 in response to rotation of the lead screw 5026 will drive the second pivot joint 5021 and the fourth pivot joint 5023 either toward one another or away from one another instead of in the same direction. This can be accomplished, for example, by forming two different threaded areas on the lead screw 5026, the first area having left-handed threads, and the second area having right-handed threads. Thus, when the electric motor 5024 rotates the lead screw 5026 in a first rotational direction, the second pivot joint 5021 and the fourth pivot joint 5023 are driven apart, which increases an angle formed between each of the first pivot arm 5016 and the second pivot arm 5018 with respect to the second side rail 5010 and moves the bumper 5006 toward the second side rail 5010 and into the retracted position. Conversely, when the electric motor 5024 drives the lead screw 5026 in a second rotational direction, the second pivot joint 5021 and the fourth pivot joint 5023 are driven together until the first pivot arm 5106 and the second pivot arm 5018 reach an orientation in which they are substantially parallel to the second side rail 5010. This places the bumper 5006 in maximum extension relative to the second side rail 5010, thereby defining the extended position for the extendable bumper system 5000.

The first side rail 5008 and the second side rail 5010, and the first pivot arm 5016 and the second pivot arm 5018, can each be formed by structural members that are adapted to crush and shorten longitudinally during an impact. This allows the extendable bumper system 5000 to crush relative to the extended position of FIG. 6 to the crushed condition of FIG. 7 in response to an impact. By forming the first pivot arm 5016 and the second pivot arm 5018 from crushable structures in addition to forming the first and second side rails 5008, 5010 from crushable structures, the extent to which the extendable bumper system 5000 can be collapsed is increased.

FIGS. 9-13 show an extendable bumper system 9000. The extendable bumper system 9000 includes a bumper 9006 that is supported with respect to a vehicle structure 9002 by a first side rail 9008 and a second side rail 9010. In order to move the extendable bumper system 9000 between a retracted position (FIG. 9), an intermediate position (FIG. 10), and an extended position (FIG. 11), the extendable bumper system 9000 includes a first extension portion 9012 and a second extension portion 9014.

The first extension portion 9012 and the second extension portion 9014 are similar and will be described with reference to the first extension portion 9012. The first extension portion 9012 includes an extension block 9028 that is connected to the first side rail 9008 by a pivot joint 9030. When the extendable bumper system 9000 is in the retracted position, the extension block 9028 is positioned in a side-by-side relationship with respect to the first side rail 9008. During movement of the extendable bumper system from the retracted position to the extended position, the extension block 9028 pivots with respect to the first side rail 9008 about the pivot joint 9030 until it is longitudinally aligned with the first side rail 9008. In the illustrated example, movement from the retracted position to the extended position involves pivoting of the extension block 9028 through an angle of approximately 180 degrees about the pivot joint 9030.

The extension block 9028 can be connected to the bumper 9006 by a bracket structure that includes an upper bracket portion 9032 and a lower bracket portion 9034. The upper bracket portion 9032 is located above the extension block 9028, and the lower bracket portion 9034 is located below the extension block 9028. In order to connect the extension block 9028 to the upper and lower bracket portions 9032, 9034, pins 9036 are formed on upper and lower surfaces of the extension block 9028. The pins 9036 are received in tracks or slots 9038 that are formed in the upper and lower bracket portions 9032, 9034. The geometric configuration of the slots 9038 is configured such that rotation of the extension block 9028 causes the first side rail 9008 to move longitudinally away from the bumper 9006 while the extension block 9028 rotates and the pins 9036 travel from a first end of the slot 9038 to a second end of the slot 9038. In order to drive rotation of the extension block 9028, an actuator can be connected to the extension block 9028, such as an electric motor (not shown) that is directly or indirectly connected to the pins 9036 of the extension block 9028.

Figure 12:
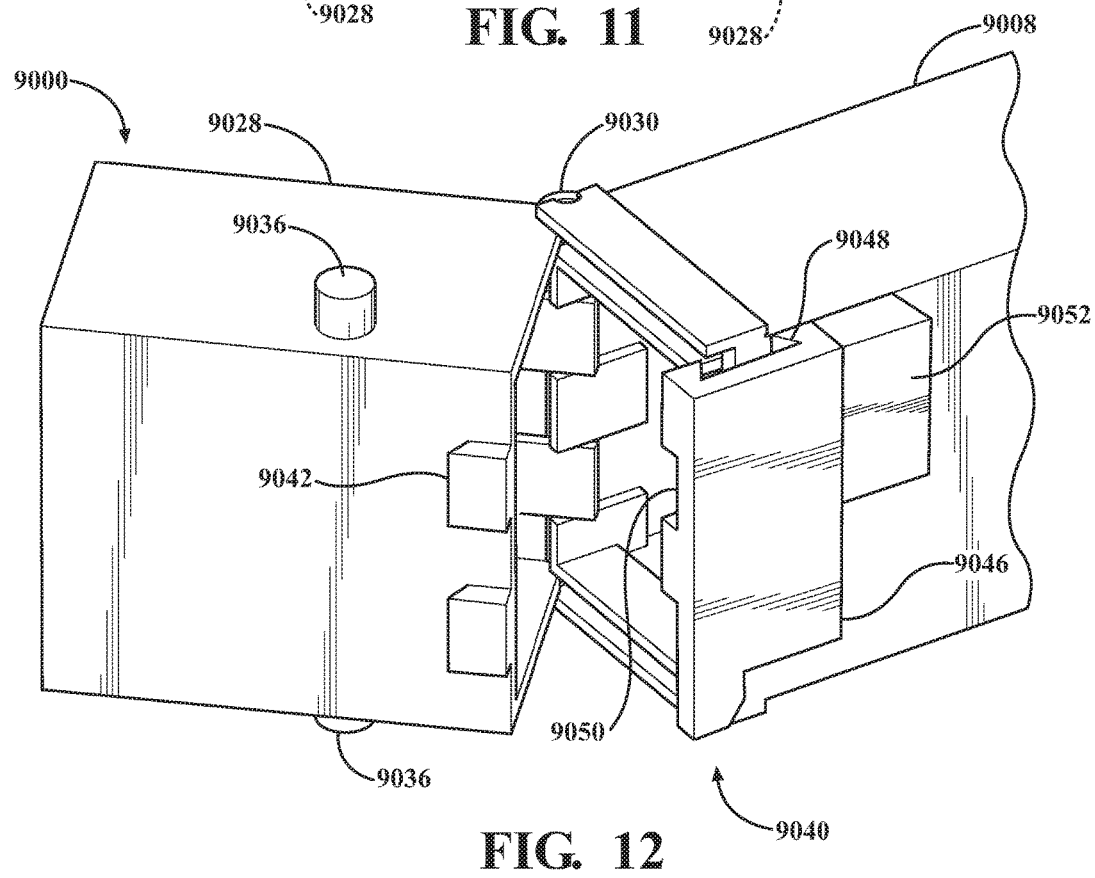
FIG. 12 is a perspective view illustration showing the extendable bumper system according to the third example including a locking mechanism in an unlocked position.
Figure 13:
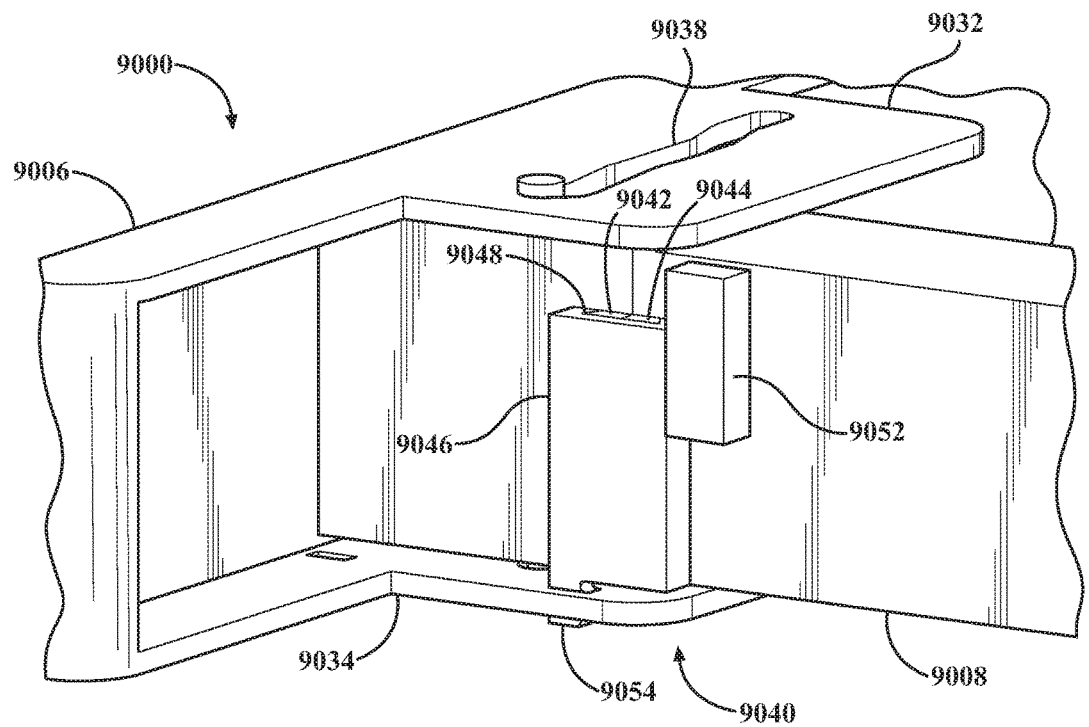
FIG. 13 is a perspective view illustration showing the extendable bumper system according to the third example including a locking mechanism in a locked position.
Figure 14:
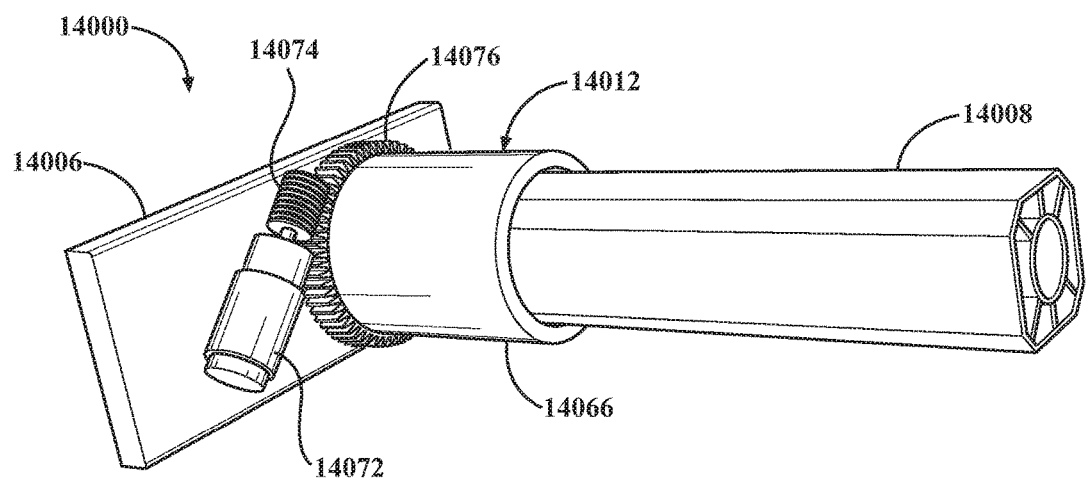
FIG. 14 is a perspective view illustration showing an extendable bumper system according to a fourth example.
Figure 15:
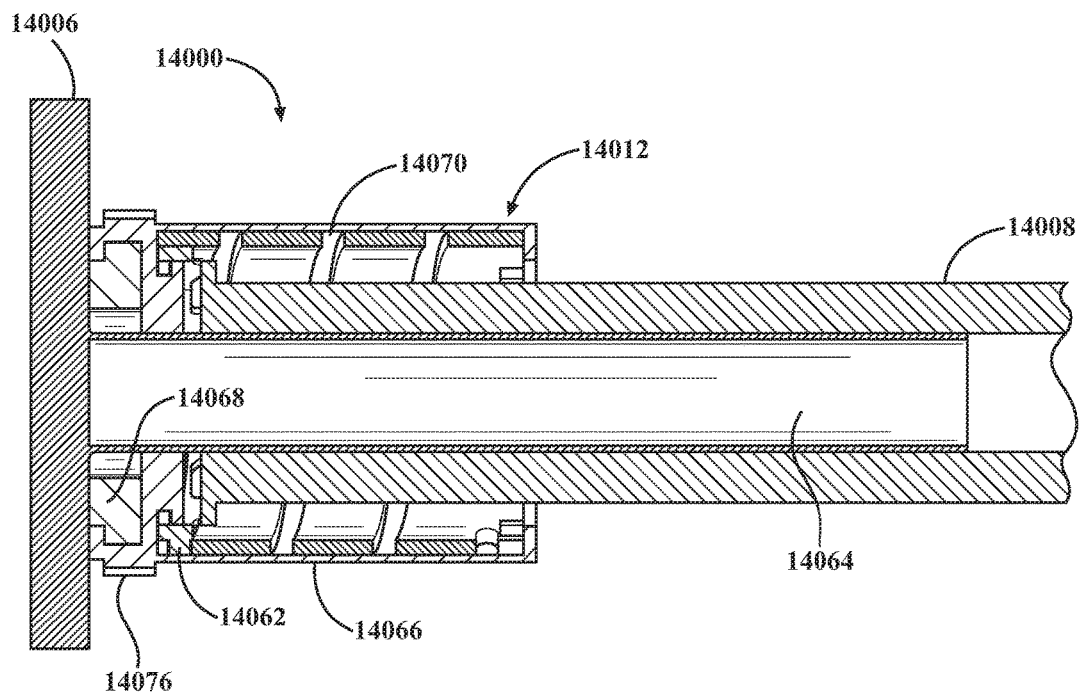
FIG. 15 is a top cross-sectional view illustration showing the extendable bumper system according to the fourth example in a retracted position.
Figure 16:
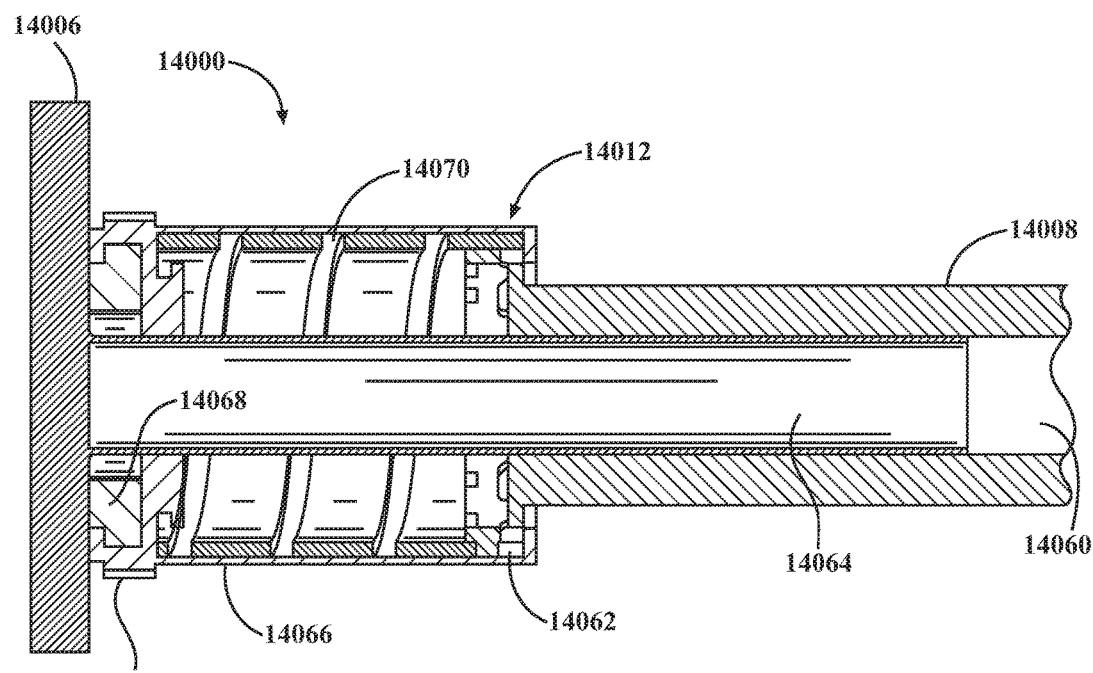
FIG. 16 is a top cross-sectional view illustration showing the extendable bumper system according to the fourth example in an extended position.
Figure 17:
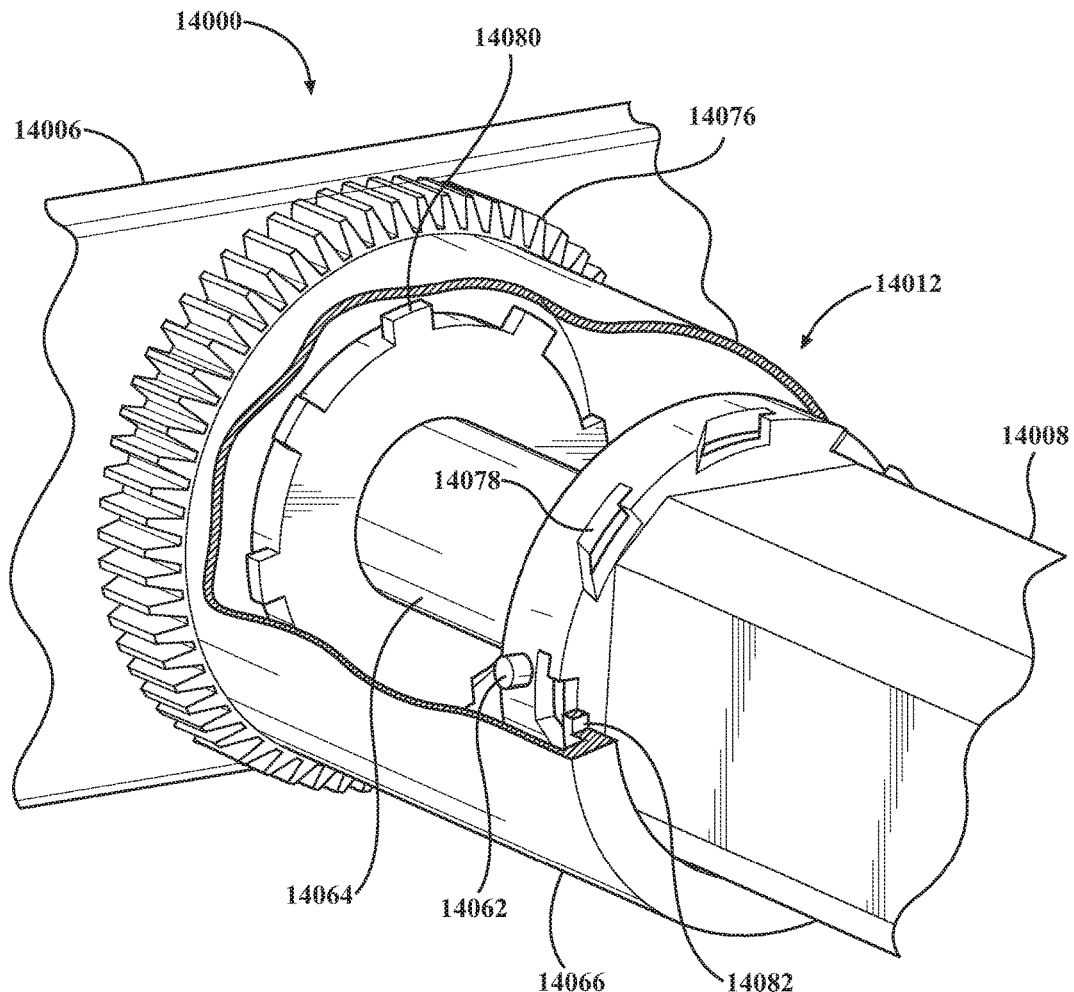
FIG. 17 is a perspective view illustration showing the extendable bumper system according to the fourth example in the extended position.
Figure 18:
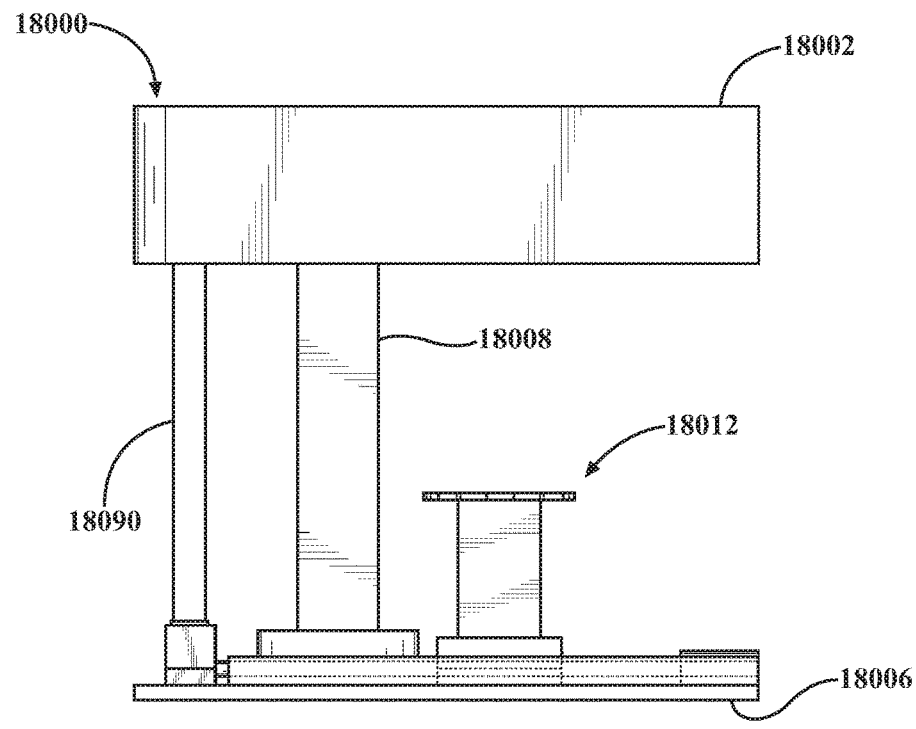
FIG. 18 is a top view illustration showing an extendable bumper system according to a fifth example in a retracted position.

As best seen in FIGS. 12-13, the extendable bumper system 9000 includes a locking mechanism 9040 that is movable between an unlocked position (FIG. 12) and a locked position (FIG. 13).

The locking mechanism 9040 includes one or more first dovetail blocks 9042 that are formed on the extension block 9028, such as by extending outward from a side surface of the extension block 9028. The locking mechanism 9040 also includes one or more second dovetail blocks 9044 that are formed on the first side rail 9008. A slide block 9046 is connected to the second dovetail blocks 9044 with the second dovetail blocks 9044 disposed within a dovetail channel 9048 that is formed by the slide block 9046. The dovetail channel 9048 extends in a first direction, and one more entry openings 9050 extend in a second direction that is transverse to the first direction, such that the entry openings 9050 provide access to the dovetail channel 9048. The entry openings 9050 are aligned with the first dovetail blocks 9042 in the unlocked position, such that the first dovetail blocks 9042 are able to enter the dovetail channel 9048 through the entry openings 9050 when the extension block 9028 is pivoted toward the extended position. Thus, the slide block 9046 does not restrain the extension block 9028 from pivoting with respect to the first side rail 9008 when the locking mechanism 9040 is in the unlocked position.

In order to move the locking mechanism 9040 between the unlocked position and the locked position, an actuator 9052 is operatively connected to the slide block 9046. The actuator 9052 may be, for example, a solenoid. The actuator is operable to move the slide block 9046 linearly, such that the second dovetail blocks 9044 move along the dovetail channel 9048 of the slide block 9046. When the extension block 9028 is pivoted between the first side rail 9008 such that the first dovetail blocks 9042 enter the dovetail channel 9048, the slide block 9046 can be moved by the actuator 9052 to move the locking mechanism 9040 to the locked position. As an example, movement from the unlocked position to the locked position can include moving linearly in the direction of the dovetail channel 9048, such as downward. By moving the slide block 9046 linearly with respect to the first dovetail blocks 9042 and the second dovetail blocks 9044, the entry openings 9050 are no longer in alignment with the first dovetail blocks 9042 when the locking mechanism 9040 is in the locked position. This prevents the extension block 9028 from pivoting with respect to the first side rail 9008 by engagement of the first dovetail blocks 9042 and the second dovetail blocks 9044 with the interior of the dovetail channel 9048 of the slide block 9046.

When the slide block 9046 is in the locked position, a locking member 9054 can be in engagement with the lower bracket portion 9034, such as being disposed in a slot or aperture. Engagement of the locking member 9054 with the lower bracket portion 9034 further restrains pivoting of the extension block 9028 with respect to the first side rail 9008. As an example, the locking member 9054 can be a structure such as a protrusion, a pin, or a tab that extends downward from the remainder of the slide block 9046. As another example, the locking member 9054 can be an end portion of the slide block 9046.

FIGS. 14-17 show an extendable bumper system 14000 that includes a bumper 14006 that is movable between a retracted position (FIG. 15) and an extended position (FIG. 16) with respect to a vehicle structure (not shown). The description herein is made with respect to a first side rail 14008 and a first extension portion 14012, but it should be understood that additional side rails and extension portions can be included to further support the bumper 14006, such as a second side rail and a second extension portion.

The first side rail 14008 can be an elongate member that has a hollow interior 14060 that extends longitudinally through it. A first end of the first side rail 14008 can be in engagement with the first extension portion 14012. As will be explained herein, one or more engaging members, such as radially-extending pins 14062, can be formed on the first side rail 14008 for engagement with the first extension portion 14012 to allow movement of the first extension portion 14012 with respect to the first side rail 14008. To support the bumper 14006 with respect to the first side rail 14008 during movement between the extended and retracted positions, a support structure 14064, such as an elongate tube, can be formed on or connected to the bumper 14006 and disposed within the hollow interior 14060 of the first side rail 14008, such that the first side rail 14008 engages and supports the support member 14064 and allows it to slide with respect to the first side rail 14008.

The first extension portion 14012 includes a housing 14066. The housing 14066 is connected to the bumper 14006 by a bearing ring 14068. The bearing ring 14068 allows the housing 14066 to rotate on its longitudinal axis with respect to the bumper 14006. The bearing ring 14068 can be rigidly connected to or formed integrally with the bumper 14006.

In order to cause motion of the bumper 14006 in response to rotation of the housing 14066, a helical track 14070 is defined inside the housing 14066. As one example, the helical track 14070 could be formed as part of the housing 14066. As another example, the helical track 14070 could be defined by an insert that is disposed within the housing 14066. Because the first side rail 14008 and the bumper 14066 are restrained from rotating, rotation of the housing 14066 causes the bumper 14066 and the first extension portion 14012 to move longitudinally with respect to the first side rail 14008 as a result of engagement of the radially-extending pins 14062 of the first side rail 14008 with the helical track 14070.

To drive rotation of the housing 14066 during movement of the bumper 14006 between the retracted position and the extended position, an actuator such as an electric motor 14072 can be provided as part of the extendable bumper system 14000. For example, the electric motor 14072 could be mounted to the bumper 14006 with rotational force transferred from a rotational output of the electric motor 14072 to the housing 14066 by a pair of corresponding gears, such as a worm gear 14074 connected to the electric motor 14072 and a gear ring 14076 disposed on an exterior surface of the housing 14066.

To resist inadvertent movement of the extendable bumper system 14000, such as in response to an impact, corresponding sets of engagement features can be formed on the first side rail 14008 and the housing 14066. As an example, slots 14078 are arrayed radially around one end of the first side rail 14088. In the retracted position, the first side rail 14008 is disposed within the housing 14066 to a maximum extent, and the slots 14078 come into engagement with a first set of engagement structures, such as projections 14080 that are formed on or connected to the housing 14066, and restrain axial motion of the housing 14066 with respect to the first side rail 14008. In the extended position, the first side rail 14008 is at a minimum degree of insertion relative to the housing 14006, and the slots 14078 are engaged by a second set of engaging structures, such as projections 14082 that are disposed at an outer end of the housing 14066 opposite the bumper 14006 and restrain axial motion of the housing 14066 with respect to the first side rail 14008.

Figure 21:
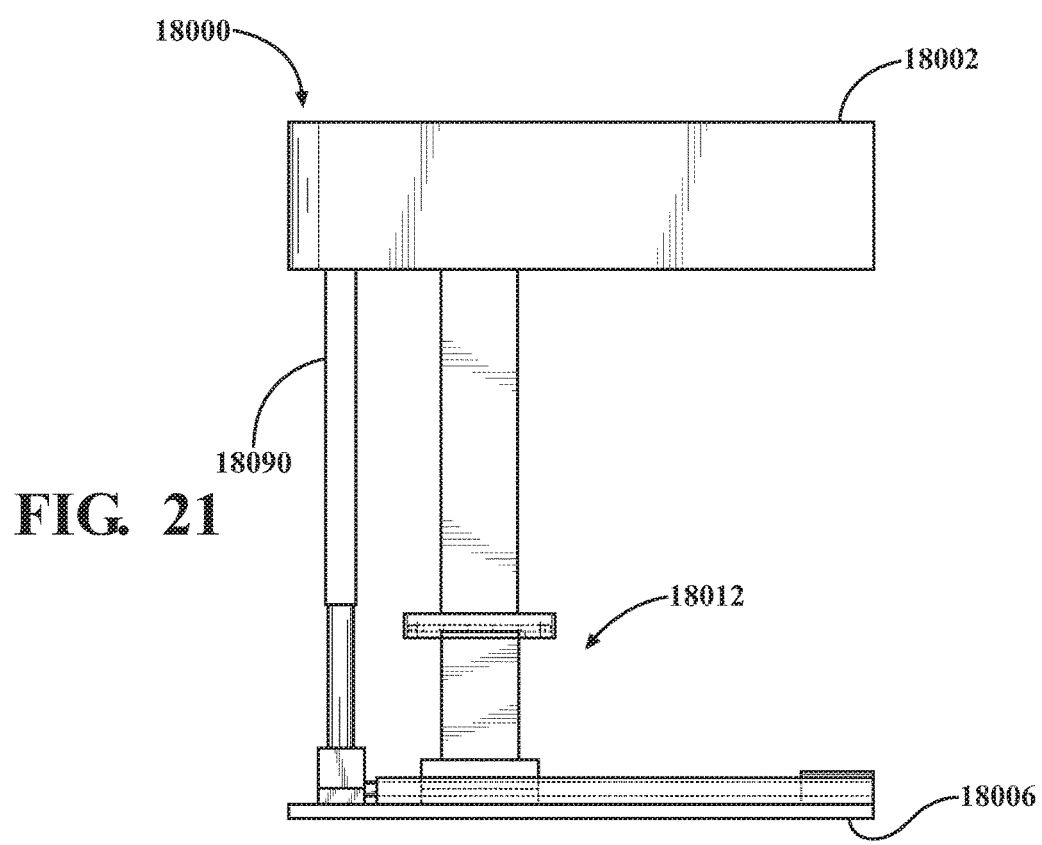
FIG. 21 is a top view illustration showing the extendable bumper system according to the fifth example in the extended position subsequent to engagement of the locking mechanism.
Figure 22:
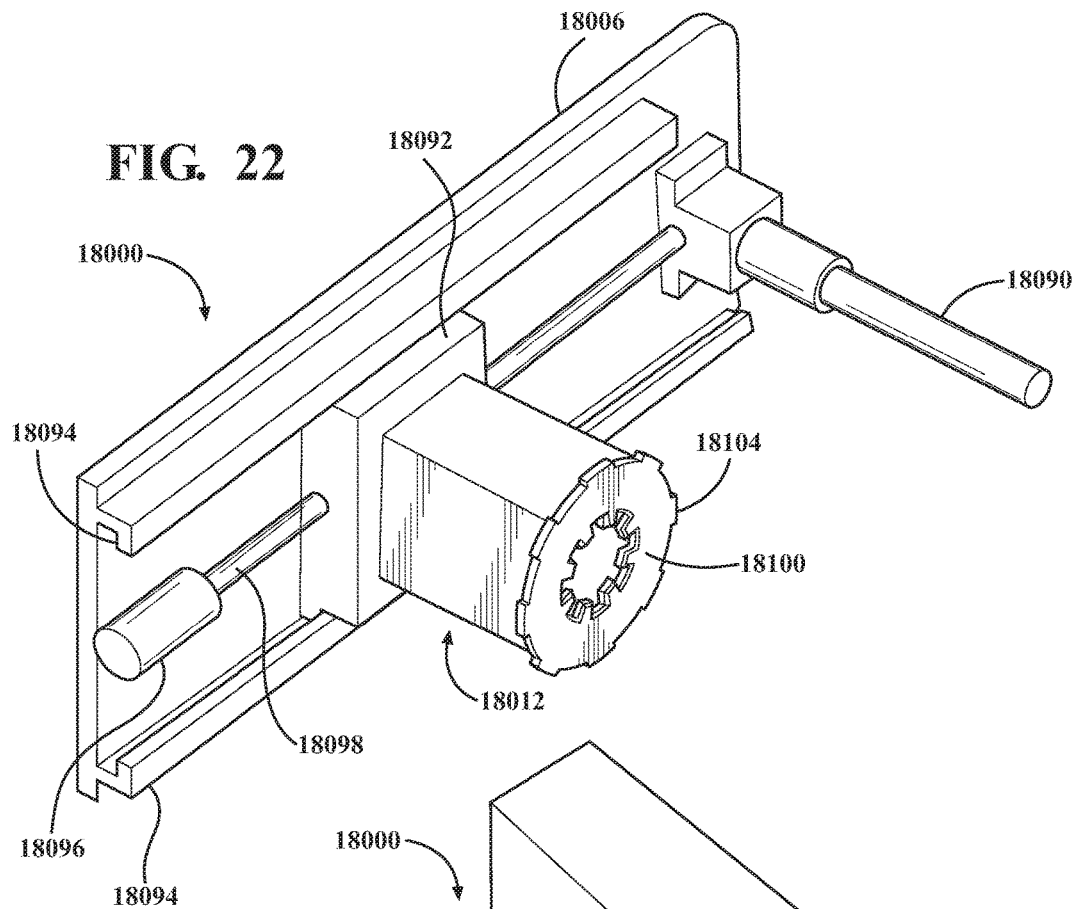
FIG. 22 is a perspective view illustration showing a portion of the extendable bumper system according to the fifth example.
Figure 23:
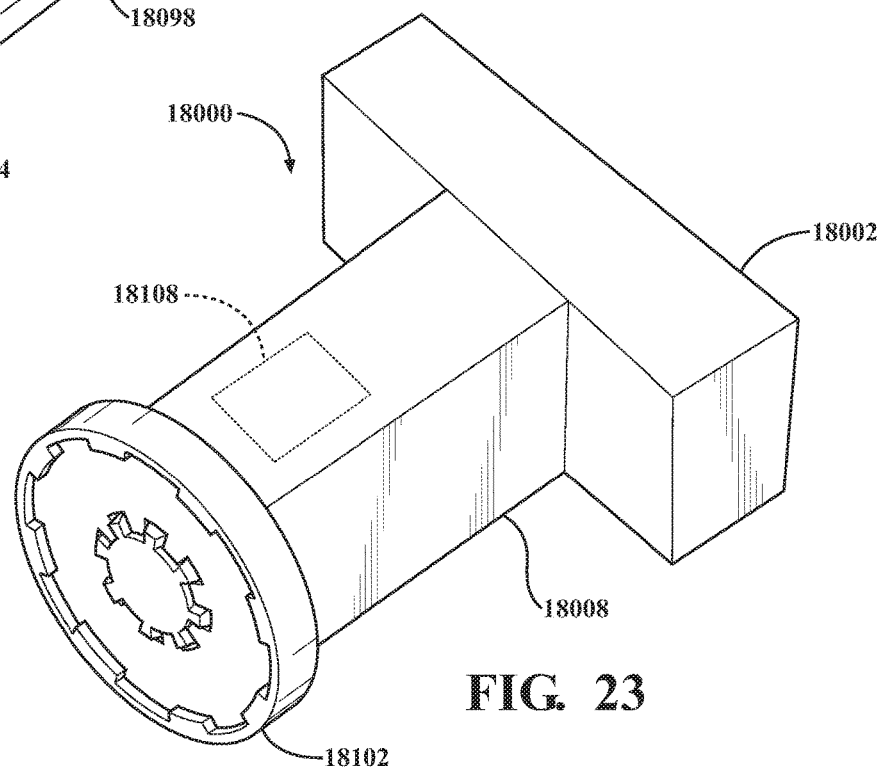
FIG. 23 is a perspective view illustration showing a portion of the extendable bumper system according to the fifth example.

FIGS. 18-23 show an extendable bumper system 18000. The extendable bumper system 18000 includes a bumper 18006 that is supported with respect to a vehicle structure 18002 for movement between a retracted position (FIG. 18) and an extended position (FIG. 21). The extendable bumper system 18000 includes one or more side rails, such as a first side rail 18008 and one or more extension portions, such as a first extension portion 18012. In order to cause movement of the bumper 18006 between the retracted position and the extended position, the extendable bumper system 18000 can include one or more linear actuators, such as a first linear actuator 18090.

Figure 19:
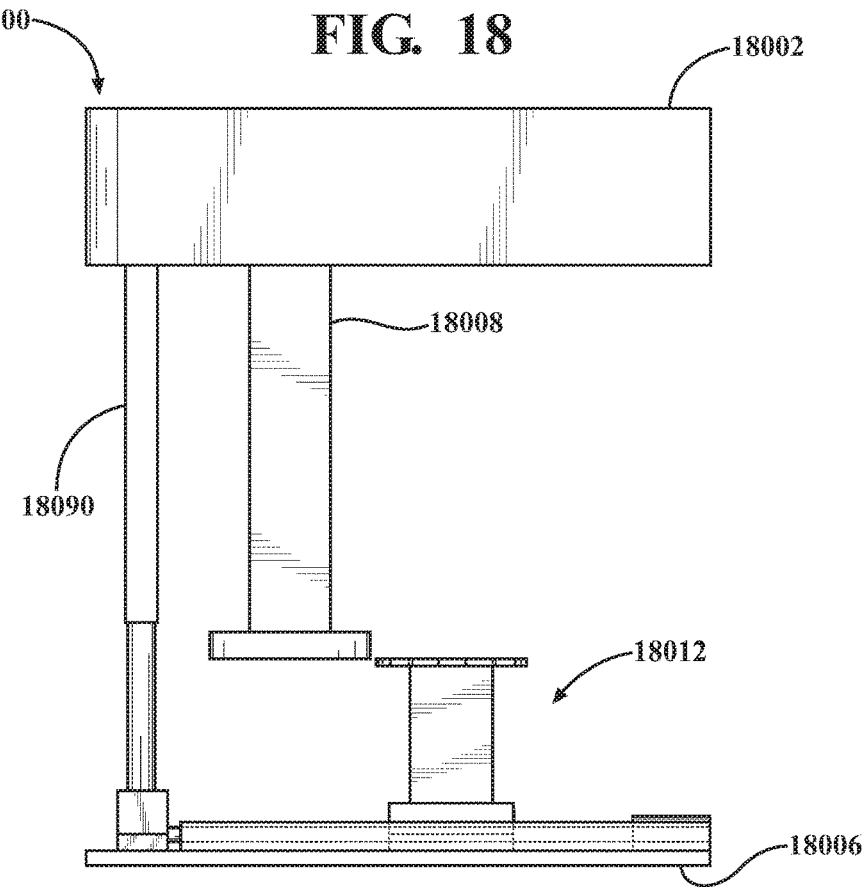
FIG. 19 is a top view illustration showing the extendable bumper system according to the fifth example in an intermediate position.
Figure 20:
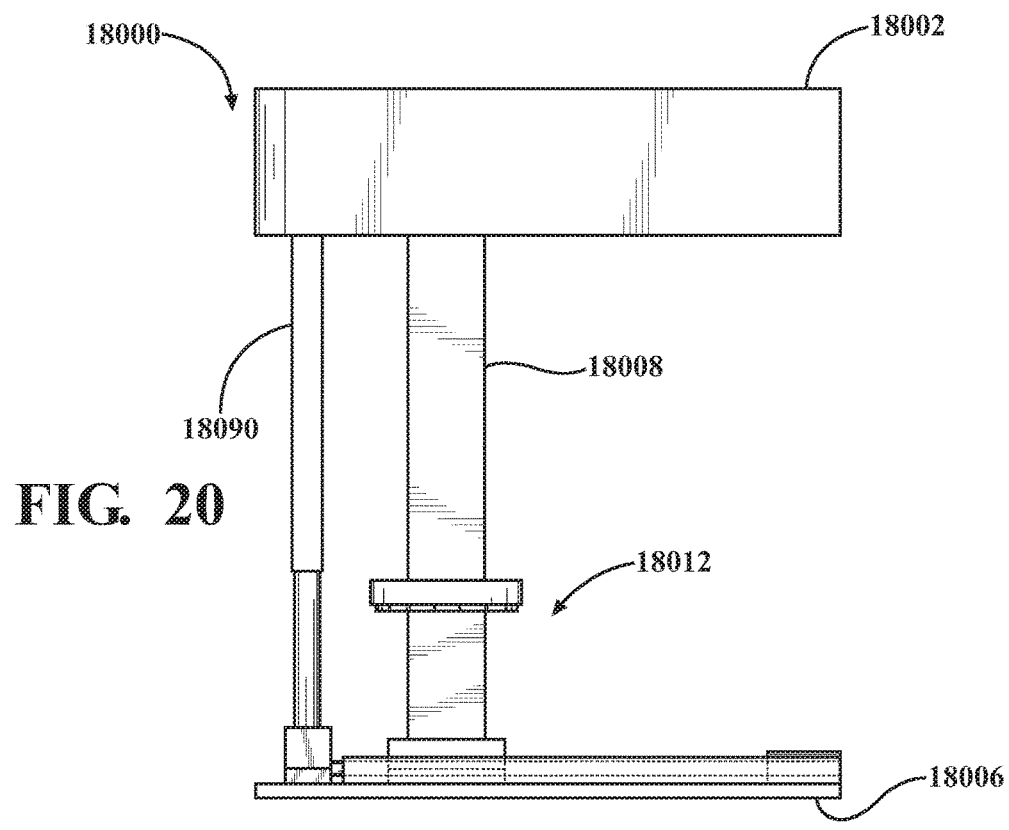
FIG. 20 is a top view illustration showing the extendable bumper system according to the fifth example in an extended position prior to engagement of a locking mechanism.

In the retracted position, the first extension portion 18012 is disposed laterally adjacent to the first side rail 18088 in a side-by-side relationship, such that the first side rail 18008 occupies a majority of the distance between the vehicle structure 18002 and the bumper 18006. In order to move the extendable bumper system 18000 toward the extended position, the bumper 18006 is moved longitudinally away from the vehicle structure 18002 by the linear actuator 18090 (FIG. 19). In this position, there is no longer a lengthwise overlap of the first extension portion 18012 with respect to the first side rail 18008. In addition, the distance between the vehicle structure 18002 and the bumper 18006 is greater than the distance between them in the extended position, as will be explained further herein.

In the extended position, the first extension portion 18012 is longitudinally aligned with the first side rail 18008. Thus, in the event of an impact while the extendable bumper system 18000 is in the extended position, force from the impact is received at the bumper 18006 and transmitted through the first extension portion 18012 to the first side rail 18008. During such an impact, both the first extension portion 18012 and the first side rail 18008 are able to crush to absorb energy from the impact.

In order to move the first extension portion 18012 into longitudinal alignment with the first side rail 18008, the first extension portion 18012 is connected to the bumper 18006 by a sliding mount 18092 that is supported by the bumper 18006 and configured to slide laterally with respect to the bumper 18006 into and out of longitudinal alignment with the first side rail 18008. The sliding mount 18092 can be disposed within tracks 18094 that are formed on the bumper 18006 or are connected to the bumper 18006. Lateral movement of the sliding mount 18092 can be caused by an actuator assembly, such as an electric motor 18096 and a lead screw 18098 that are connected to the sliding mount 18092. The actuator assembly may also provide a rotational input to the linear actuator 18090 to drive extension and retraction of the linear actuator 18090 using rotation of the lead screw 18098.

Once the first extension portion 18012 is longitudinal alignment with the first side rail 18008 (FIG. 20), the linear actuator 18090 retracts slightly to bring the first extension portion 18012 into engagement with the first side rail 18008 (FIG. 21). In order to retain the engagement between the first side rail 18008 and the first extension portion 18012, the extendable bumper system 18000 includes a locking assembly defined by a first locking structure 18100 that is provided on the first extension portion 18012 and a second locking structure 18102 that is provided on the first side rail 18008. In the illustrated example, the first locking structure 18100 is a round plate-like member that has a plurality of outwardly-extending radial projections 18104. The second locking structure 18102 is a round ring-like member that has a plurality of inwardly-extending radial projections 18106. When the first extension portion 18102 moves into engagement with the first side rail 18008, the first locking structure 18100 passes into the second locking structure 18102, such that the outwardly-extending radial projections 18104 of the first locking structure 18100 move past the inwardly-extending radial projections 18106 of the second locking structure 18102, for example, into an annular channel defined in the second locking structure 18102. The inwardly-extending radial projections 18106 are then interlocked with the outwardly-extending radial projections 18104, by relative rotation of the inwardly-extending radial projections 18106 and the outwardly-extending radial projections 18104. For example, interlocking the inwardly-extending radial projections 18106 and the outwardly-extending radial projections 18104 can include rotating the inwardly-extending radial projections 18106 using a rotational actuator 18108, which is operably connected to the second locking structure 18102 and may be disposed within the first side rail 18008. This places the second locking structure 18102 in a locked condition with respect to the first locking structure 18100, which prevents movement of the first extension portion 18012 toward the retracted position from the extended position.

In order to move the extendable bumper system 18000 from the extended position to the retracted position, the first locking structure 18100 and the second locking structure 18102 are moved to the unlocked condition, such as by rotating the second locking structure 18102 to disengage the inwardly-extending radial projections 18106 of the second locking structure 18102 from the outwardly-extending radial projections 18104 of the first locking structure 18100. The linear actuator 18090 is then used to move the bumper 18006 away from the vehicle structure 18002. The extension portion 18012 is then shifted laterally with respect to the bumper 18006 using the sliding mount 18092, the electric motor 18096, and the lead screw 18098, until the first extension portion 18012 is no longer longitudinally aligned with the first side rail 18008, and the bumper 18006 can be moved toward the retracted position without interference between the first side rail 18008 and the first extension portion 18012. The linear actuator 18090 is then used to move the bumper 18006 toward the vehicle structure 18002 until the bumper 18006 is fully retracted, thereby establishing the retracted position of the extendable bumper system 18000.

Figure 24:
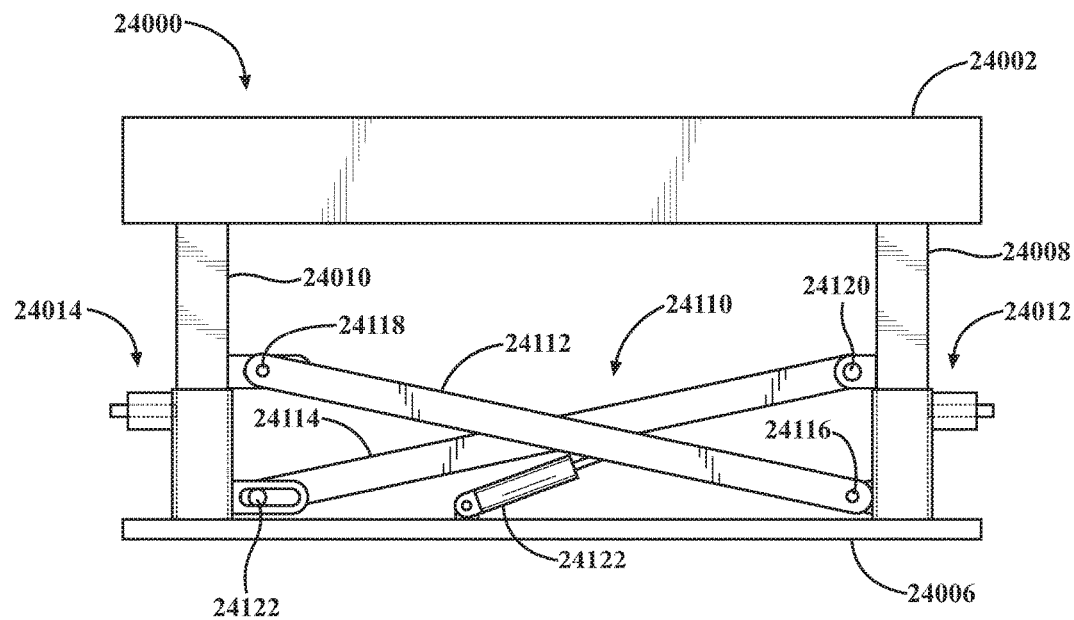
FIG. 24 is a top view illustration showing an extendable bumper system according to a sixth example in a retracted position.
Figure 25:
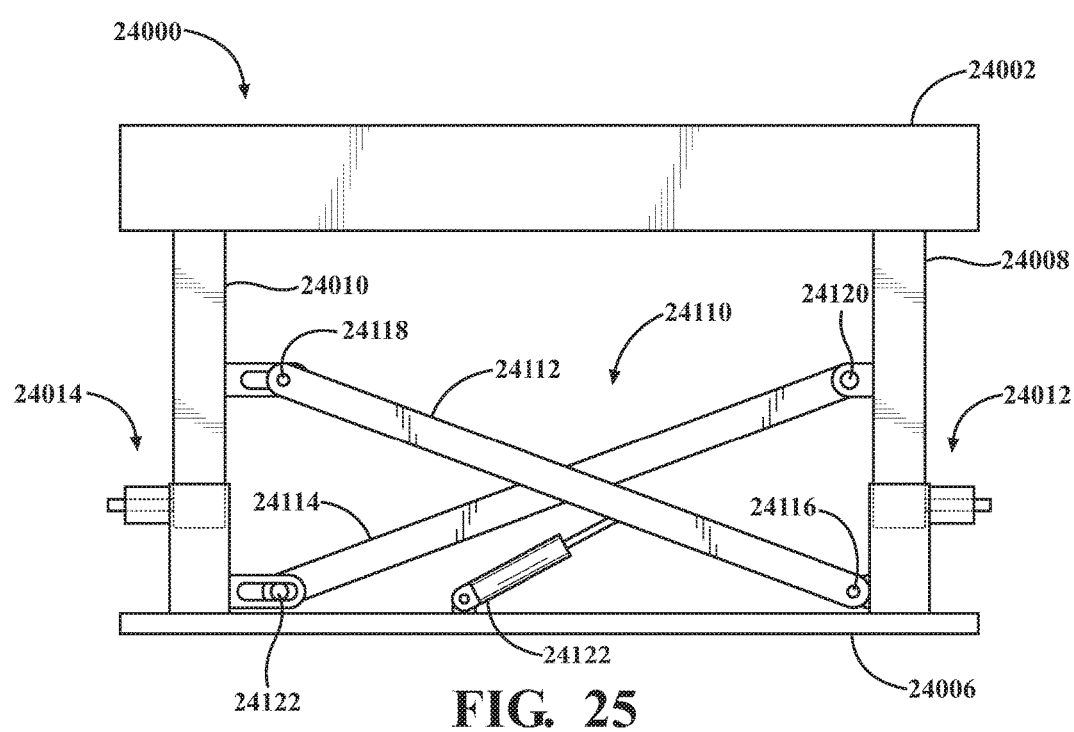
FIG. 25 is a top view illustration showing the extendable bumper system according to the sixth example in an extended position prior to engagement of a locking mechanism.
Figure 26:
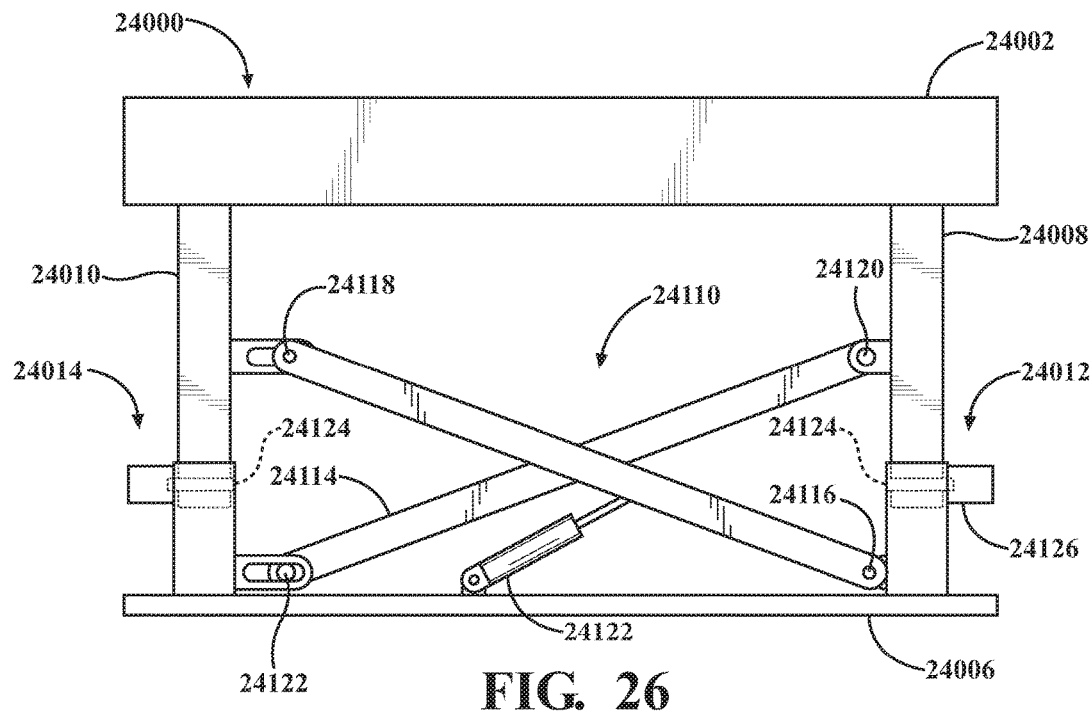
FIG. 26 is a top view illustration showing the extendable bumper system according to the sixth example in the extended position subsequent to engagement of the locking mechanism.

FIGS. 24-26 show an extendable bumper system 24000. The extendable bumper system 24000 includes a bumper 24006 that is movable between a retracted position (FIG. 24) and an extended position (FIG. 25) with respect to a vehicle structure 24002. The extendable bumper system 24000 includes a first side rail 24008 that is slidably connectable to a first extension portion 24012. The extendable bumper system 24000 also includes a second side rail 24010 that is slidably connected to a second extension portion 24014. The bumper 24006 is connected to the first extension portion 24012 and the second extension portion 24014 to allow movement of the bumper 24006 between the retracted and extended positions.

The extendable bumper system 24000 includes a scissor mechanism 24110 that is operable to cause movement of the bumper 24006 between the retracted and extended positions. The scissor mechanism 24110 includes a first beam 24112 and a second beam 24114. The first beam 24112 and the second beam 24114 are arranged in an X-shaped configuration. The first beam 24112 is connected to the first extension portion by a first pivot joint 24116 and is connected to the second side rail 24010 by a first pivotable sliding joint 24118. The second beam 24114 is connected to the first side rail 24008 by a first pivot joint 24120 and is connected to the second extension portion 24014 by a second pivotable sliding joint 24122.

To cause motion of the scissor mechanism 24110, a linear actuator 24122 is pivotally connected to each of the bumper 24006 and the first beam 24112. Alternatively, the linear actuator 24122 could be connected to the vehicle structure 24002 instead of the bumper 24006. Alternatively, the linear actuator 24122 could be connected to the second beam 24114 instead of to the first beam 24112. Extension of the linear actuator 24122 causes the scissor mechanism 24110 to move the extendable bumper system 24000 from the retracted position toward the extended position. Retraction of the linear actuator 24122 causes the scissor mechanism 24110 to move the extendable bumper system 24000 from the extended position toward the retracted position. In one example, the linear actuator 24122 is a pneumatic or hydraulic piston-cylinder device. In another implementation, the actuator 24122 is an electrical actuator, such as an electric motor and lead screw combination.

In order to restrain the extendable bumper system 24000 from moving out of the extended position, the extendable bumper system 24000 can include one or more locking mechanisms. The illustrated example includes locking mechanisms that each include a lock pin 24124 and an actuator 24126. As an example, the actuator 24126 can be a solenoid. In an unlocked position, the lock pins 24124 are connected to a respective one of the first extension portion 24012 and the second extension portion 24014.

To establish the locked position (FIG. 26), the actuators 24126 cause the lock pins to move into engagement with the first side rail 24008 and the second side rail 24010, such as by passing through apertures formed in each of the first side rail 24008 and the second side rail 24010. This places the lock pins 24124 into simultaneously engagement with a respective one of the first and second extension portions 24012, 24014, as well as a respective one of the first and second side rails 24008, 24010, which locks the position of the bumper 24006 with respect to the vehicle structure 24002.

Figure 27A:
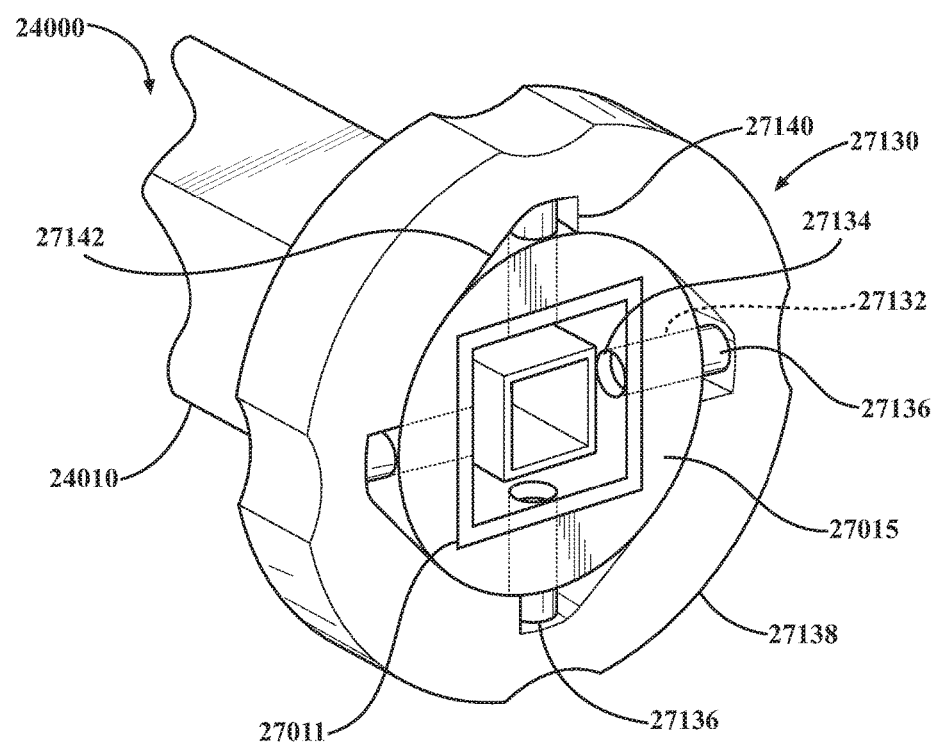
FIG. 27A is a perspective view illustration showing a locking mechanism in an unlocked position.
Figure 27B:
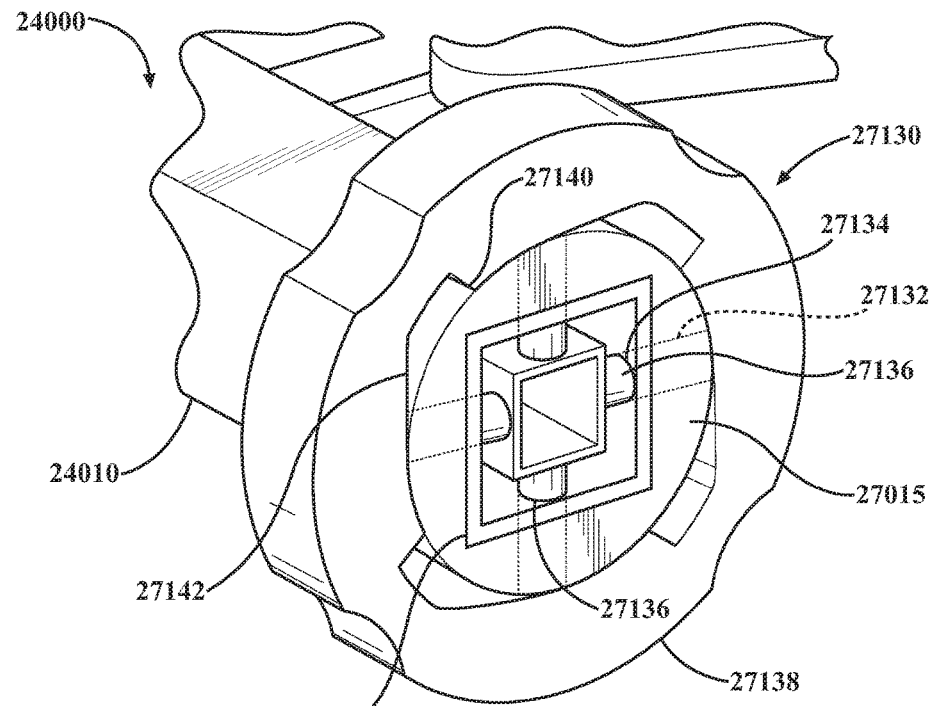
FIG. 27B is a perspective view illustration showing a locking mechanism in a locked position.

FIGS. 27A-27B show an alternative implementation of the extendable bumper system 24000 in which the lock pin 24124 and the actuator 24126 are replaced by a locking assembly 27130. The locking assembly 27130 is movable between an unlocked position (FIG. 27A) in which the second extension portion 24014 is not restrained from sliding with respect to the first extension portion 24010, and a locked position (FIG. 27B) in which the second extension portion 24014 is restrained from moving with respect to the second side rail 24010.

An end portion 27015 of the second extension portion 24014 has a circular outer periphery and a square inner periphery in which an end portion 27011 of the second side rail 24010 is disposed. A plurality of cylindrical apertures 27132 are formed through the end portion 27015 of the first extension portion 24014. A corresponding plurality of cylindrical apertures 27134 are formed through the end portion 27011 of the first side rail 24010. The apertures 27132, 27134 extend radially through the end portions 27015, 27011, respectively. In the extended position of the extendable bumper system 24000, the pluralities of apertures 27132, 27134 are aligned with each other.

In order to lock the second side rail 24010 with respect to the second extension portion 24014, the locking assembly 27130 includes a plurality of pins 27136 that are each disposed within a respective one of the cylindrical apertures 27132 that are formed in the end portion 27015 of the second extension portion 24014. The pins 27136 are able to move from a first position in which they are disposed within the cylindrical apertures 27132 of the end portion 27015 of the first extension portion and not in the cylindrical apertures 27134 of the end portion 27011 of the second side rail 24010, to a second position in which the pins 27132 are disposed within the apertures 27132 and the apertures 27134. When the pins 27136 are disposed in the second position, the pins 27136 engage both the second side rail 24010 and the second extension portion 24014 20104 prevent relative motion.

The locking assembly 27130 includes a collar 27138 that extends around the end portion 27015 of the second extension portion 24014 adjacent to the pins 27136. An inner periphery of the collar 27138 includes pockets 27140 that deviate from a circular cross-section in order to allow the pins 27138 to extend outward from an outer periphery of the end portion 27015 of the second extension portion 24014. Each of the pockets 27140 includes a ramp surface 27142. The collar 27140 is rotatable such that the ramp surface 27142 of each of the pockets 27140 engages a respective one of the pins 27136 to cause it to slide inward toward the end portion 27011 of the second side rail 24010 until each of the pins 27136 is disposed at least partially within one of the apertures 27134 formed in the end portion 27011 of the second side rail 24010. This places the locking assembly 27130 in the locked position. To locking assembly 27130 back to the unlocked position, the collar 27138 is located in the opposite direction, and the pins 27136 move radially outward under the influence of means such as a spring-biased until they are disposed within the pockets 27140 to a maximum extent and no longer partially disposed within the cylindrical apertures 27134 of the end portion 27011 of the second side rail 24010.

Figure 28:
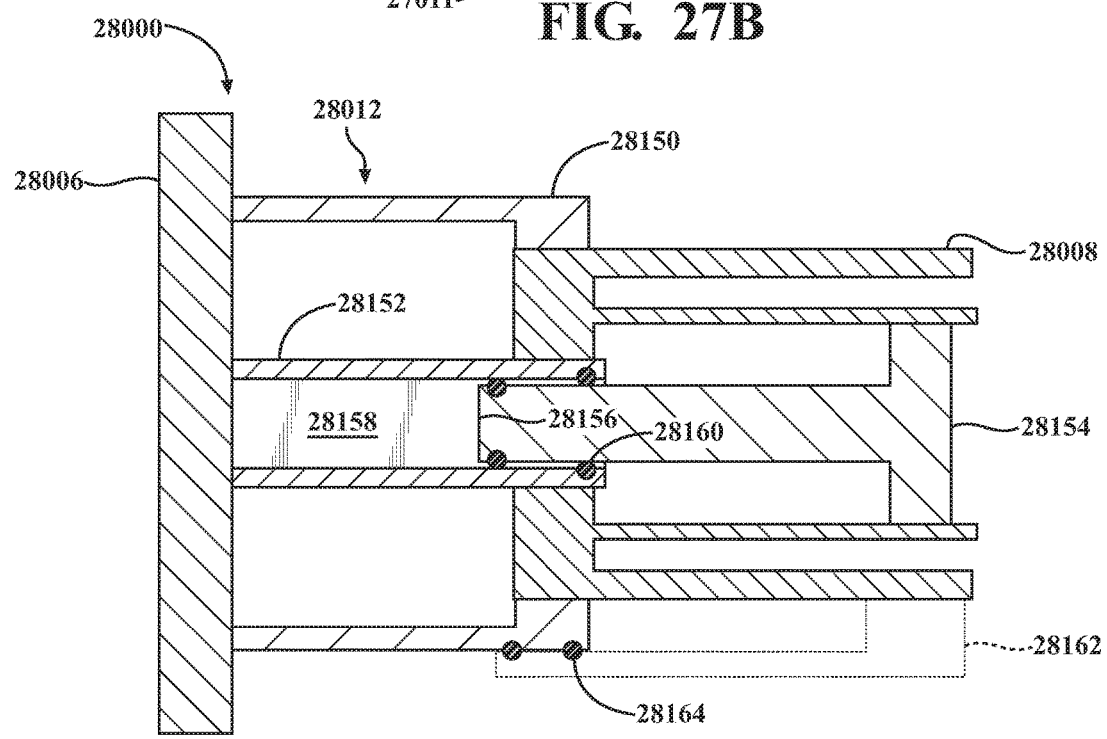
FIG. 28 is a top cross-sectional view illustration showing a collapsible beam structure for an extendable bumper system.
Figure 29:
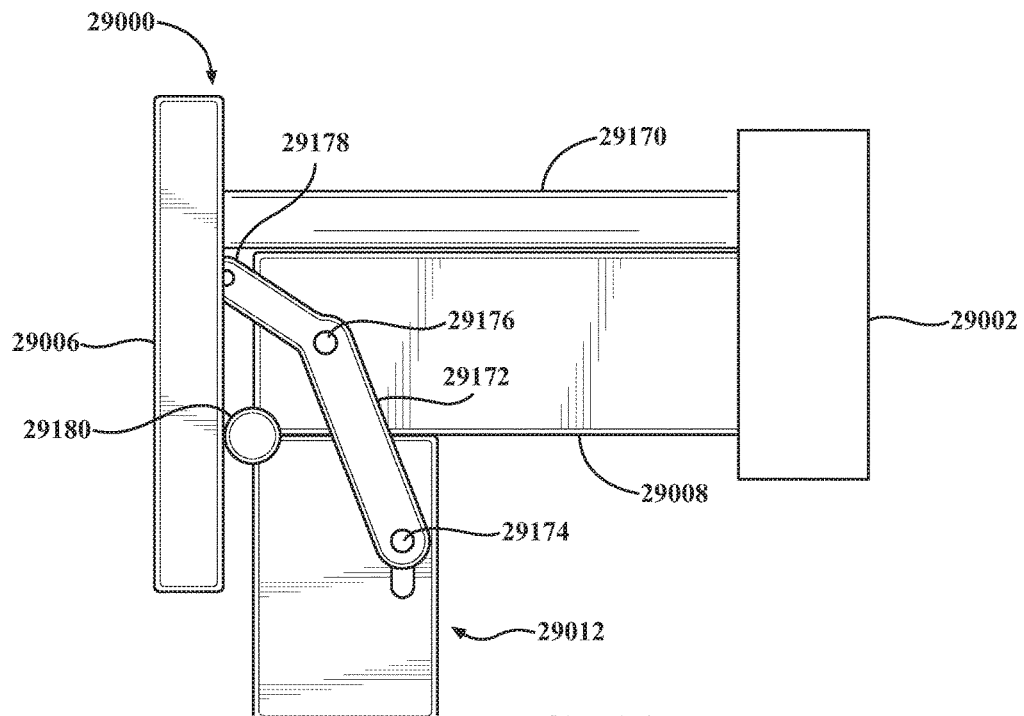
FIG. 29 is a top view illustration showing an extendable bumper system according to a seventh example in a retracted position.
Figure 30:
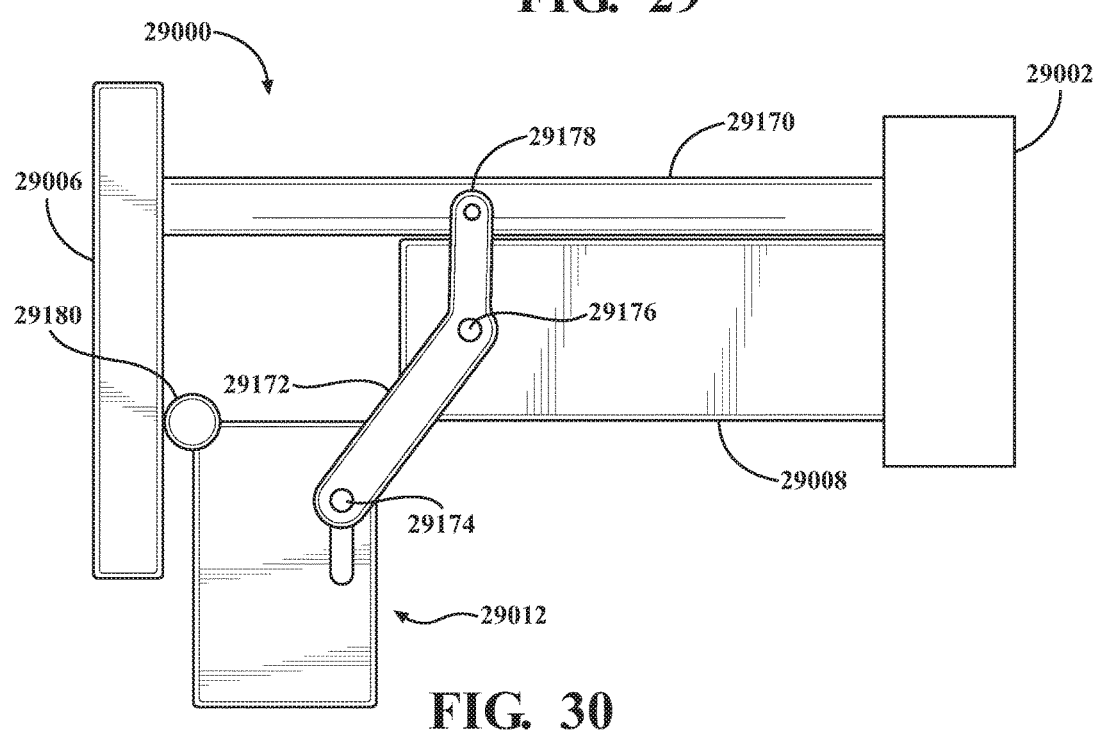
FIG. 30 is a top view illustration showing the extendable bumper system according to the seventh example in a first intermediate position.
Figure 31:
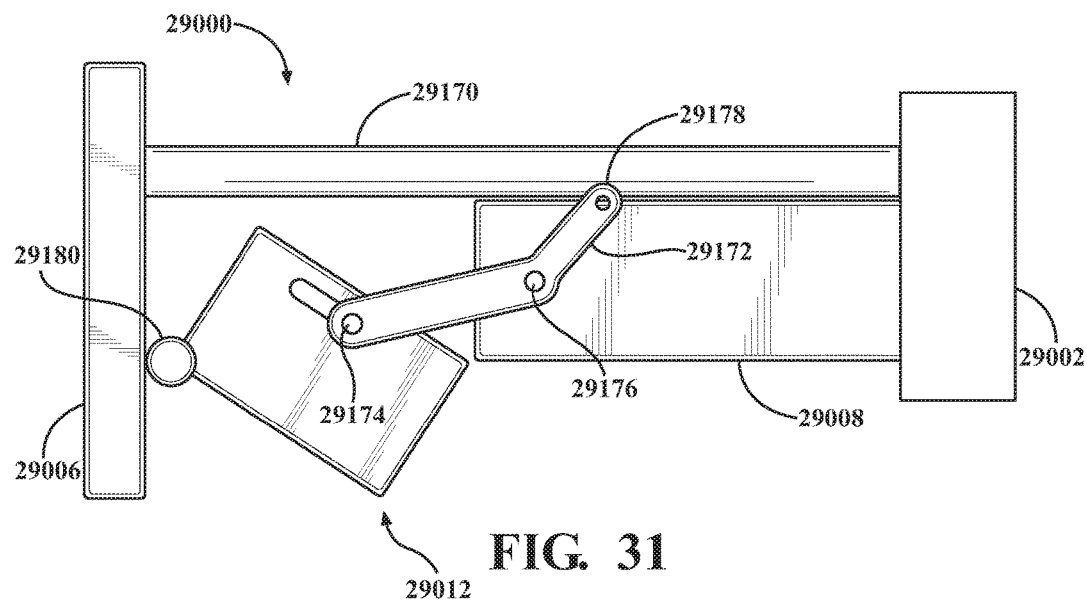
FIG. 31 is a top view illustration showing the extendable bumper system according to the seventh example in a second intermediate position.
Figure 32:
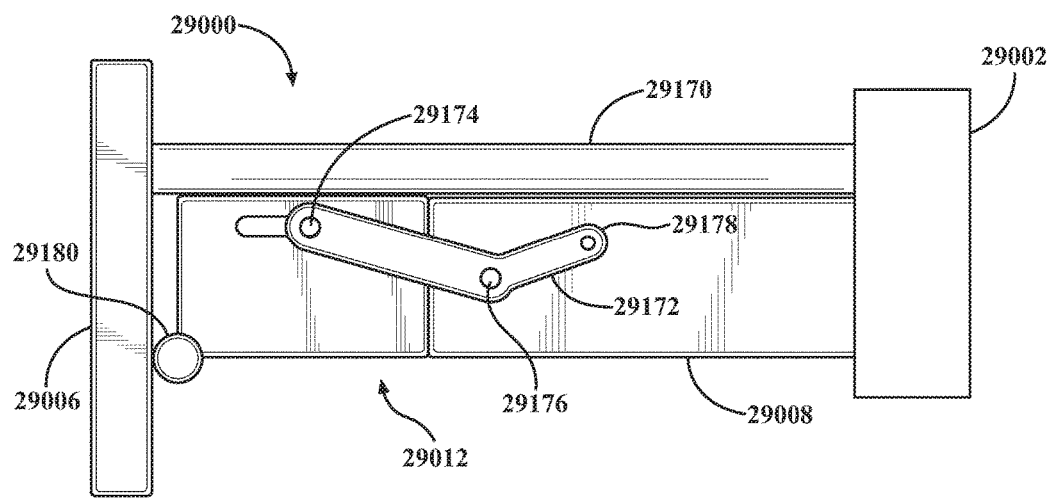
FIG. 32 is a top view illustration showing the extendable bumper system according to the seventh example in an extended position.

FIG. 28 shows an extendable bumper system 28000 in which a bumper 28006 is supported by a first side rail 28008 and the first extension portion 28012. The first extension portion 28012 includes an outer tube 28150 and an inner tube 28152. At least part of the first side rail 28008 is receivable within the space between the outer tube 28150 and the inner tube 28152 during extension and is able to slide within this space with respect to the first extension portion 28008 toward and away from the bumper 28006 during extension and retraction of the extendable bumper system 28000. In order to cause extension and retraction of the extendable bumper system 28000, any type of actuator or actuator assembly can be used with the extendable bumper system 28000, such as the actuators and actuator assemblies described herein with respect to other implementations.

The bumper 28006 is supported with respect to the first side rail 28008 by engagement of the outer tube 28150 and the inner tube 28152 with the first side rail 28008. The bumper 28006 is further supported by a central support 28154 that is connected to the inner tube 28152 and extends into an interior space defined within the first side rail 28008 such that it engages internal surfaces of the first side rail 28008.

The central support 28154 is configured to collapse into the inner tube 28152 during an impact. This prevents the central support 28154 from impeding full crushing of the first side rail 28008. An end portion 28156 of the central support 28154 is disposed within a hollow interior 28158 of the inner tube 28152. The end portion 28156 of the central support 28154 is connected to an interior surface of the inner tube 28152 by a plurality of welded fuses 28160 are configured to rigidly connect the central support 28154 to the inner tube 28152 during normal conditions, but to break during an impact. When the welded fuses 28160 break, the end portion 28156 of the central support 28154 is able to slide inward along the hollow interior 28158 of the inner tube 28152 toward the bumper 28006. Since the central support 28154 is nested within the inner tube 28152 during an impact, it does not restrain crushing of the first side rail 28008.

In addition to the central support 28154, additional support can be provided, such as an outer support tube 28162 that is connected to an exterior surface of the outer tube 28150 of the first extension portion 28012 by welded fuses 28164. During normal operation, the outer support 28162 engages an exterior surface of the first side rail 28008 to support the first side rail 28008. During an impact, the welded fuses 28164 break and the outer support tube 28162 collapses by sliding onto the exterior of the outer tube 28152 toward the bumper 28006 and in the manner described with respect to the central support 28154.

FIGS. 29-32 show an extendable bumper system 29000 that includes a bumper 29006 that is movable between a retracted position (FIG. 29) and an extended position (FIG. 32) with respect to a vehicle structure 29002. To move the bumper 29006 between the retracted position and the extended position, the extendable bumper system 29000 can include a linear actuator assembly 29170 that is operable to move the bumper 29006 away from and toward the vehicle structure 29002.

The extendable bumper system 29000 includes a first side rail 29008 and a first extension portion 29012. The first side rail 29008 extends a majority of the distance between the bumper 29006 and the vehicle structure 29002 in the retracted position. In the retracted position, the first extension portion 29012 is disposed laterally adjacent to the first side rail 29008 and is not disposed between the first side rail 29008 and the bumper 29006. As the extendable bumper system moves from the retract position to the extended position, the first extension portion 29012 is moved into longitudinal alignment with the first side rail 29008 by a crank 29172. The crank 29172 is connected to the first extension portion 29012 by a pivotable sliding joint 29174. The crank 29172 is connected to the first side rail 29008 by a pivot joint 29176. The crank 29172 can also include an end portion 29178 that is opposite the pivotable sliding joint 29174 and is connectable to an actuator (not shown) that drives movement of the crank 29172 as the extendable bumper system 29000 moves between the retracted and extended positions.

The first extension portion 29012 is connected to the bumper 29006 by a pivot joint 29180 that allows the first extension portion 29012 to pivot through an angle of approximately 90 degrees between the retracted and extended positions. In the retracted position, a longitudinal axis of the first extension portion 29012 is disposed at a generally perpendicular angle with respect to the longitudinal axis of the first side rail 29008. In the extended position, the first extension portion 29012 is rotated with respect to the bumper 29006 and the first side rail 29008, such that the longitudinal axis of the first extension portion 29012 is substantially aligned with the longitudinal axis of the first side rail 29008.

Moving the extendable bumper system 29000 from the retracted position toward the extended position can commence by moving the bumper 29006 away from the body structure 29002 using the linear actuator assembly 29170. During movement to a first intermediate position (FIG. 30), the crank 29172 pivots and slides with respect to the first extension portion 29012 at the pivotable sliding joint 29174. During movement to the first intermediate position, the first extension portion 29012 does not rotate. During movement from the first intermediate position to the second intermediate position, the crank 29172 induces rotation of the first extension portion 29012 about the pivot joint 29180. This pivots the first extension portion 29012 toward longitudinal alignment with the first side rail 29008.

Once the first extension portion 29012 reaches longitudinal alignment with the first side rail 29008, the linear actuator assembly 29170 can move the bumper 29006 slightly toward the vehicle structure 29002 in order to bring the first extension portion 29012 into engagement with the first side rail 29008. This allows force to be transferred from the bumper 29006 through the first extension portion 29012 to the first side rail 29008 in the event of an impact.

Movement of the extendable bumper system 29000 back to the retracted position from the extended position is performed by reversing the process described for movement of the extendable bumper system 29000 from the retracted position to the extended position.

Figure 33:
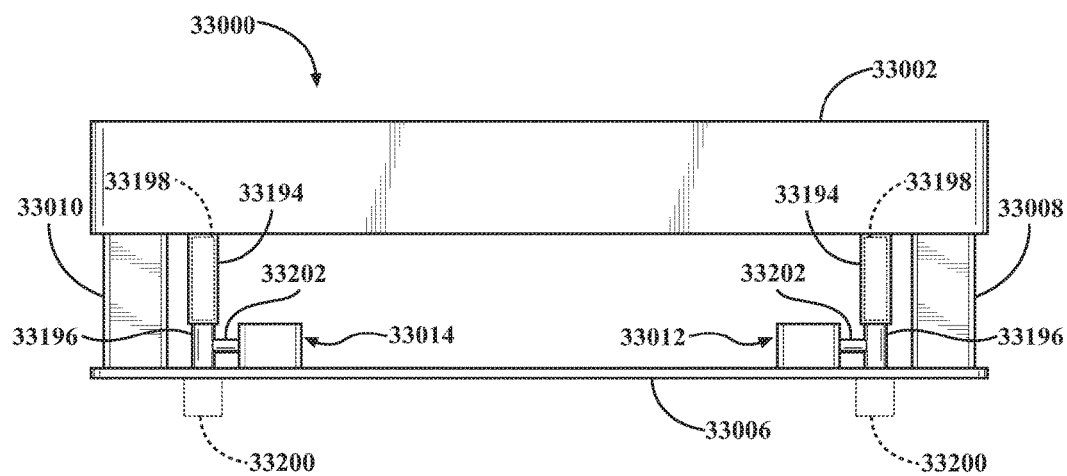
FIG. 33 is a top view illustration showing an extendable bumper system according to an eighth example in a retracted position.
Figure 34:
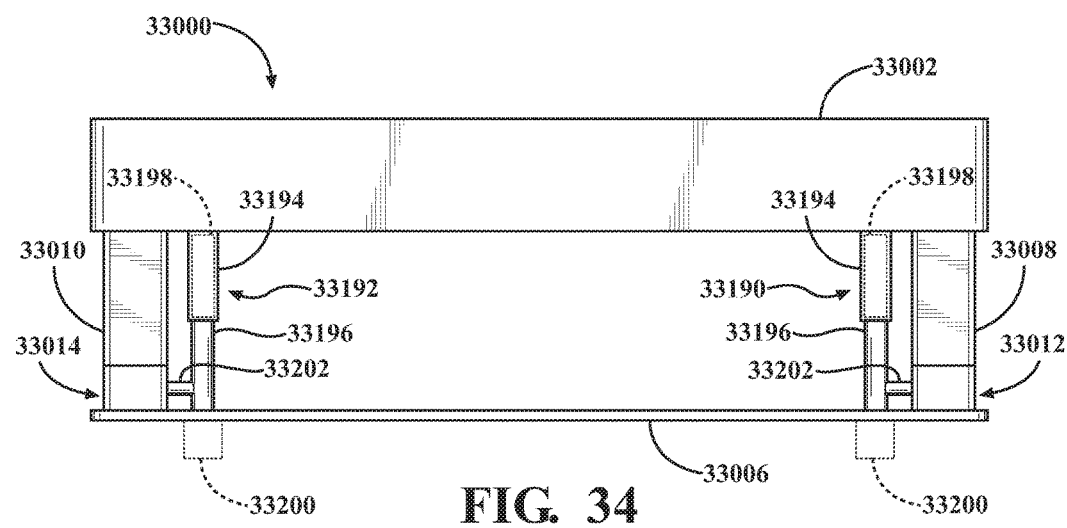
FIG. 34 is a top view illustration showing the extendable bumper system according to the eighth example in an extended position.

FIGS. 33-34 show an extendable bumper system 33000 that is movable between a retracted position (FIG. 33) and an extended position (FIG. 34). The extendable bumper system 33000 includes a bumper 33006 that is supported for movement with respect to a vehicle structure 33002. In the retracted position, the first and second side rails 33008, 33010 extend between the vehicle structure 33002 and the bumper 33006. In the extended position, the bumper 33006 is moved away from the vehicle structure 33002 and a first extension portion 33012 and a second extension portion 33014 are disposed between the first and second side rails 33008, 33010, respectively. The first extension portion 33012 is connected to a first actuator assembly 33190. The second extension portion 33014 is connected to a second actuator assembly 33192. The first and second actuator assemblies 33190, 33192 are operable to move the bumper 33006 away from and toward the vehicle structure 33002, as well as to move the first and second extension portions 33012, 33014 into and out of longitudinal alignment with the first side rail 33008 and the second side rail 33010, respectively.

The first and second actuator assemblies 33190, 33192 each include a first portion 33194 and a second portion 33196, with the first portions 33194 being connected to the vehicle structure 33002 and the second portions 33196 being connected to the bumper 33006. The second portions 33196 are mounted to the bumper 33006 in a manner that permits rotation of the second portions 33196 around their respective longitudinal axes. The first portions 33194 are connected to the second portions 33196 by respective helical tracks 33198 such that rotation of the second portions 33196 with respect to the first portions 33194 causes longitudinal movement of the second portions 33196 with respect to the first portions 33194 to thereby cause longitudinal movement of the bumper 33006 with respect to the vehicle structure 33002 between the retracted and extended positions. To cause rotation of the second portions 33196, each of the first and second actuator assemblies 33190, 33192 includes a respective rotary actuator 33200, such as an electric motor.

The first actuator assembly 33190 and the second actuator assembly 33192 each include a radially-extending portion 33202 that is connected to their respective second portion 33196 adjacent to the bumper 33006. The radially-extending portions 33202 of the first actuator assembly 33190 and the second actuator assembly 33192 are connected to the first extension portion 33012 and the second extension portion 33014, respectively. Thus, as the second portions 33196 are rotated by the rotary actuators 33200 to extend and retract the extendable bumper 33006, the first and second extension portions 33012, 33014 are moved along circular arcs that extend around the respective longitudinal axes of the second portions 33196 of the first actuator assembly 33190 and the second actuator assembly 33192. Thus, when the extendable bumper system 33000 is in the retracted position, the first and second extension portions 33012, 33014 are disposed inboard of the first and second side rails 33008, 33010.

As the extendable bumper system 33000 moves from the retracted position to the extended position, the first and second actuator assemblies 33190, 33192 cause the bumper 33006 to move longitudinally away from the vehicle structure 33002, which creates a space between the first and second side rails 33008, 33010, and the bumper 33006. Simultaneously, the first and second extension portions 33012, 33014 rotate around the second portions 33196 until they reach the space that has been defined between the first and second side rails 33008, 33010 until the first and second extension portions 33012, 33014 are longitudinally aligned with the first and second side rails 33008, 33010 and thereby disposed between the first and second side rails 33008, 33010 and the bumper 33006.

Moving the extendable bumper system 33000 from the extended position to the retracted position is performed by reversing the operations described for movement from the retracted position to the extended position.

Figure 35:
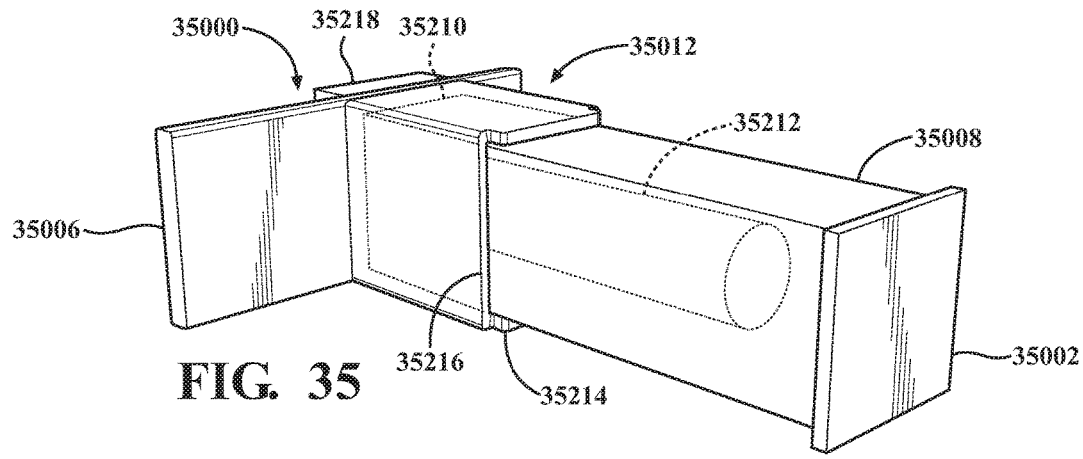
FIG. 35 is a perspective view illustration showing an extendable bumper system according to a ninth example in a retracted position.
Figure 36:
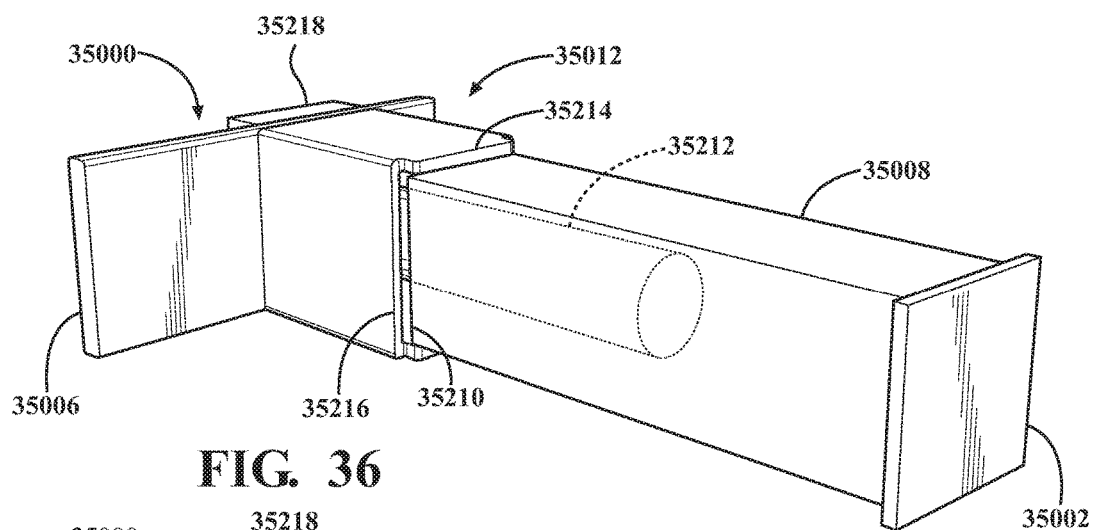
FIG. 36 is a perspective view illustration showing the extendable bumper system according to the ninth example in an intermediate position.
Figure 37:
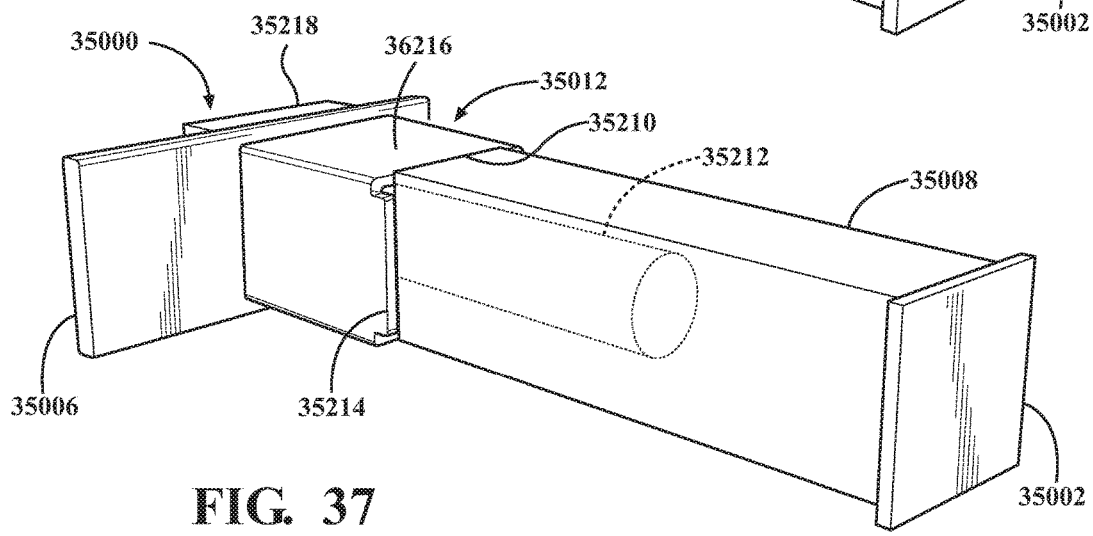
FIG. 37 is a perspective view illustration showing the extendable bumper system according to the ninth example in an extended position.

FIGS. 35-37 show an extendable bumper system 35000. The extendable bumper system 35000 includes a bumper 35006 that is supported for movement with respect to a vehicle structure 35002 by a first side rail 35008 and a first extension portion 35012. The extendable bumper system 35000 is movable between a retracted position (FIG. 35), and intermediate position (FIG. 36), and an extended position (FIG. 37).

The first side rail 35008 includes an end portion 35210 that is disposed within a hollow interior of the first extension portion 35012 in the retracted position. Extension of the extendable bumper system 35000 from the retracted position to the extended position is caused by a linear actuator 35212. As an example, the linear actuator 35212 can be disposed within the hollow interiors of the first side rail 35008 and the first extension portion 35012. As an alternative, the linear actuator 35212 could be disposed outside of the first side rail 35008 and the first extension portion 35012. The linear actuator 35212 moves the bumper 35006 away from the vehicle structure 35002 until the end portion 35201 of the first side rail 35008 has moved out of the first extension portion 35012, which places the extendable bumper system 35000 in the intermediate position.

In the intermediate position, the end portion 35210 of the first side rail 35008 is longitudinally spaced from a first pair of end surfaces 35214 and a second pair of end surfaces 35216 of the first extension portion 35012. Since the first extension 35012 is not in engagement with the first side rail 35008 in the intermediate position, the first extension portion 35012 is free to rotate with respect to the first side rail 35008 and the bumper 35006 in response to a rotational force supplied by a rotational actuator 35218. As an example, the rotational actuator 35218 can be supported by the bumper 35006 and operably connected to the first extension portion 35012.

To move the extendable bumper system 35000 from the intermediate position to the extended position, the rotational actuator 35218 is utilized to rotate the first extension portion 35012 by approximately 90 degrees with respect to the bumper 35006 and the first side rail 35008. In the illustrated implementation, the first side rail 35008 and the first extension portion 35012 have rectangular cross-sections that are complementary in size to one another, for example, such that the exterior surfaces of the first side rail 35008 fit closely with respect to the interior surfaces of the first extension portion 35012 when the first side rail 35008 is disposed within the first extension portion 35012 in the retracted position. Due to the rectangular cross-sections of the first side rail 35008 and the first extension portion 35012, when the first extension portion 35012 is rotated by approximately 90 degrees, mechanical interference between the misaligned rectangular cross-sections of the first side rail 35008 and the first extension portion 35012 restrains the first side rail 35008 from retracting into the interior of the first extension portion 35012. Thus, in the extended position, with the first extension portion 35012 rotated with respect to the first side rail 35008, engagement of the first extension portion 35012 with the first side rail 35008 prevents movement from the extended position toward the retracted position.

To lock the first extension portion 35012 against rotation with respect to the first side rail 35008 in the extended position, the linear actuator 35212 is used to move the first extension portion 35012 toward the first side rail 35008, such that they are engaged with one another, subsequent to rotation of the first extension portion 35012. Rotation of the first extension portion 35012 with respect to the first side rail 35008 is restrained by engagement of the first pair of end surfaces 35214 with the exterior of the first side rail 35008. The first pair of end surfaces 35214 extend longitudinally outward from the second pair of end surfaces 35216. The first pair of end surfaces 35214 are defined on a pair of opposing sides of the rectangular cross-section of the first extension portion 35012, while the second pair of end surfaces 35216 are formed on the other opposing sides of the rectangular cross-section of the first extension portion 35012. Thus, longitudinal motion of the first extension portion 35012 with respect to the first side rail 35008 is restrained by engagement of the second pair of end surfaces 35216 with the end portion 35210 of the first side rail 35008. At the same time, rotational motion of the first extension portion 35012 with respect to the first die rail 35008 is restrained by engagement of the first pair of end surfaces 35214 with the exterior of the end portion 35210 of the first side rail 35008.

Movement of the extendable bumper system 35000 from the extended position toward the retracted position is performed in a manner opposite that described for movement from the retracted position to the extended position.

Figure 38:
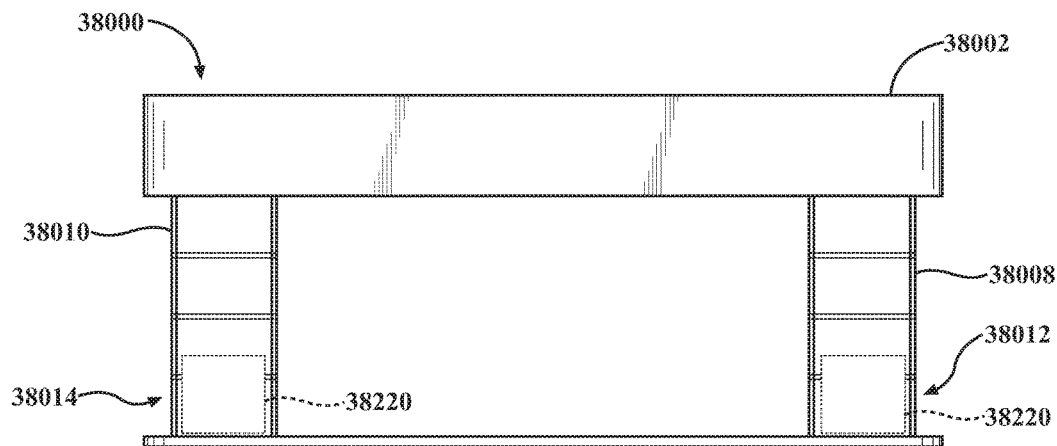
FIG. 38 is a top view illustration showing an extendable bumper system according to a tenth example in a retracted position.
Figure 39:
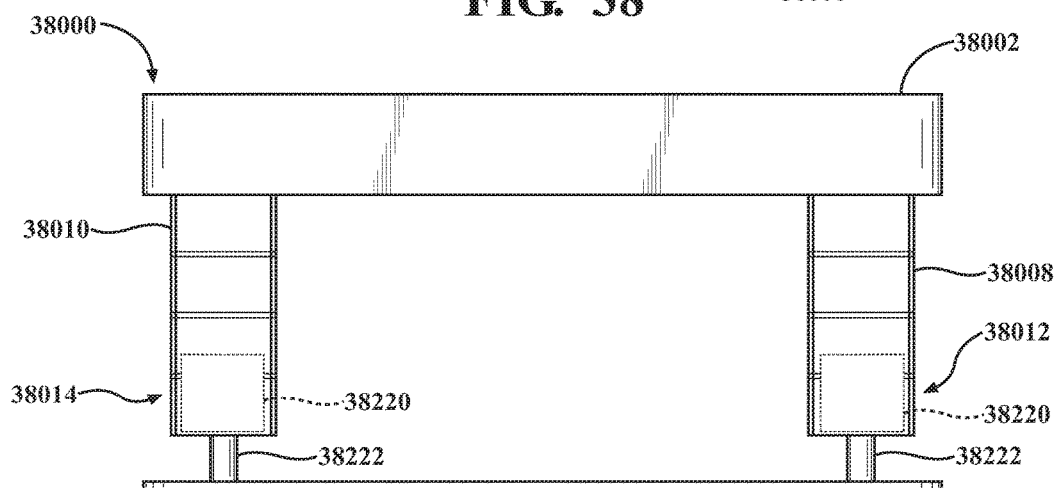
FIG. 39 is a top view illustration showing the extendable bumper system according to the tenth example in an extended position.
Figure 40:
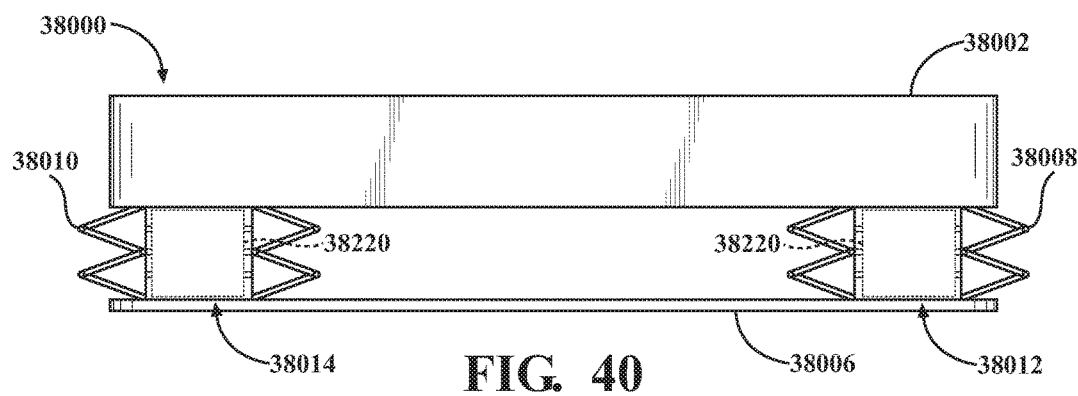
FIG. 40 is a top view illustration showing the extendable bumper system according to the tenth example in a collapsed condition.

FIGS. 38-40 show an extendable bumper system 38000. The extendable bumper system 38000 includes a bumper 38006 that is supported for movement with respect to a vehicle structure 38002 by a first extension portion 38012 and a second extension portion 38014, as well as a first side rail 38008 and a second side rail 38010.

The first extension portion 38012 and the second extension portion 38014 each include a cylinder 38220 and an associated piston 38222. The cylinders 38220 can be, as examples, hydraulically actuated or pneumatically actuated cylinders. Actuation of the cylinders 38220 by fluid pressure is operable to move the pistons 38222 into and out of the cylinders 38220. Thus, the extendable bumper system 38000 is movable from the retracted position to the extended position by applying fluid pressure to the cylinders 38220 to extend the pistons 38222 out of the cylinders 38220, which moves the bumper 38006 away from the vehicle structure 38002.

In the illustrated example, the cylinders 38220 are disposed within a hollow interior of the first side rail 38008 and the second side rail 38010. The pistons 38222 are partially disposed and supported by the cylinders 38220 and are also connected to the bumper 38006. In this manner, extension of the pistons 38222 out of the cylinders 38220 moves the bumper 38006 longitudinally away from the first side rail 38008 and the second side rail 38010.

The cylinders 38220 are configured such that they do not interfere with crushing of the first side rail 38008 and the second side rail 38010 during an impact. To prevent interference, the longitudinal length of each of the cylinders 38220 is equal to or less than the expected length of the first side rail 38008 and the second side rail 38010 in a crushed condition (FIG. 40). As an example, the cylinders 38220 can be sized such that their longitudinal length is approximately equal to the expected longitudinal length of each of the first side rail 38008 and a second side rail 38010 in the crushed condition.

Figure 41:
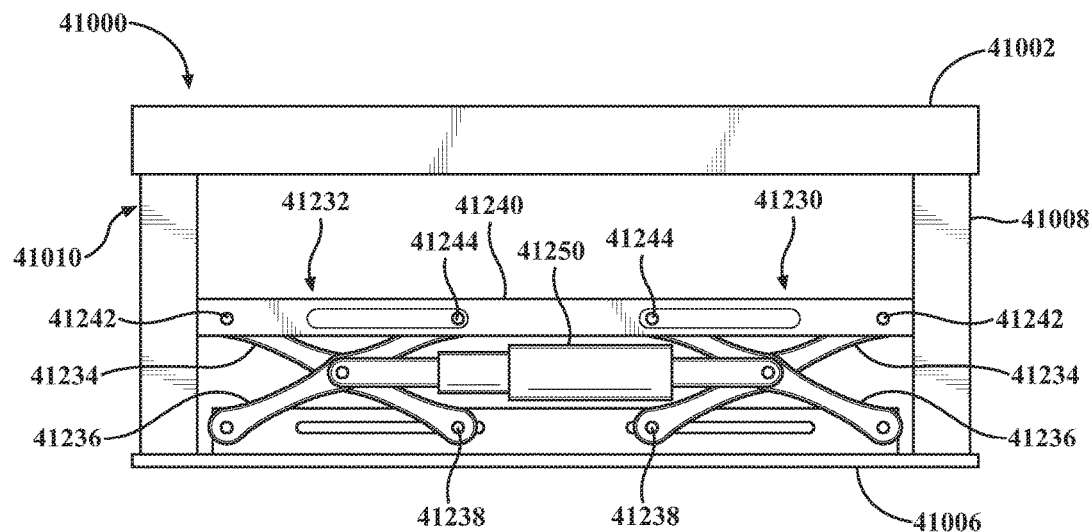
FIG. 41 is a top view illustration showing an extendable bumper system according to an eleventh example in a retracted position.
Figure 42:
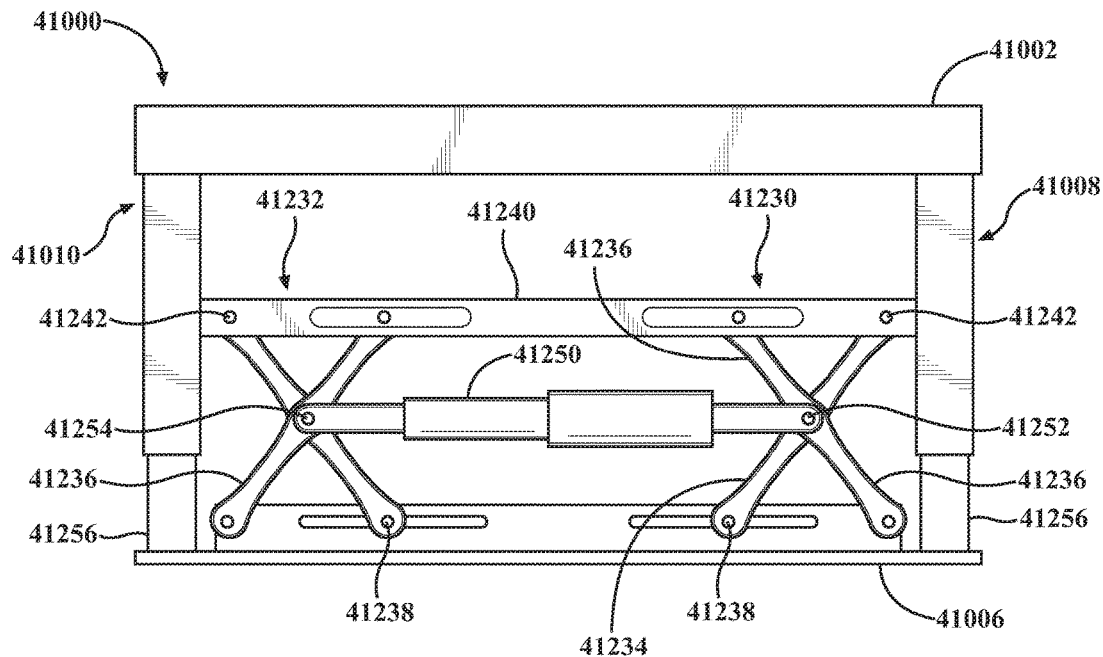
FIG. 42 is a top view illustration showing the extendable bumper system according to the eleventh example in an extended position.

FIGS. 41-42 show an extendable bumper system 41000. The extendable bumper system 41000 includes a bumper 41006 that is supported for movement with respect to a vehicle structure 41002 between a retracted position (FIG. 41) and an extended position (FIG. 41).

The bumper 41006 is supported for movement with respect to the vehicle structure 41002 by the first side rail 41008 and the second side rail 41010 by a first X-shaped scissor assembly 41230 and a second X-shaped scissor assembly 41232. The first X-shaped scissor assembly 41230 is positioned adjacent to the first side rail 41008 and the second X-shaped scissor assembly 41232 is positioned adjacent to the second side rail 41010. Each of the first and second X-shaped scissor assemblies 41230, 41232 includes a first member 41234 and a second member 41236 that are connected to each other in an X-shaped configuration. The first members 41234 are each connected to the bumper 41006 by pivotable sliding joints 41238 and are connected to a cross member 41240 that extends between the first and second side rails 41008, 41010, by pivot joints 41242. The second members 41236 are connected to the bumper 41006 by pivot joints 41246 and are connected to the cross member 41240 by pivotable sliding joints 41244.

To move the extendable bumper system 41000 between the retracted and extended positions, a linear actuator 41250 is positioned between the first and second X-shaped scissor assemblies 41230, 41232. A first end of the linear actuator 41250 is connected to a central pivot joint 41252 at which the first and second members 41234, 41236 of the first X-shaped scissor assembly 41230 are pivotally connected. A second end of the linear actuator 41250 is connected to the second X-shaped scissor assembly 41232 at a central pivot joint 41254 at which the first and second members 41234, 41236 of the second X-shaped scissor assembly 41232 are pivotally connected.

In order to move the extendable bumper assembly 41000 from the retracted position to the extended position, the linear actuator 41250 is cause to extend its overall length, which increases the distance between the central pivot joint 41252 of the first X-shaped scissor assembly 41230 and the second central pivot joint 41254 of the second X-shaped scissor assembly 41232. This causes the ends of the first and second members, 41234 of the first and second X-shaped scissor assemblies 41230, 41232 to move closer together, which causes corresponding longitudinal movement of the bumper 41006 with respect to the vehicle structure 41002. In addition to being supported by the first and second X-shaped scissor assemblies 41230, 41232, the bumper 41006 can be further supported by telescopic supports 41256 that are connected to the bumper 41006 and telescopically related to each of the first side rail 41008 and the second side rail 41010.

In the illustrated example, the linear actuator 41250 is a fluid operated cylinder, such as a hydraulically operated cylinder. In this implementation, the linear actuator 41250 is operable to resist movement of the bumper 41006 from the extended position toward the retracted position in the event of an impact at a controlled rate, such as by expelling fluid from the linear actuator 41250 using, for example, a bleeder valve.

Figure 43:
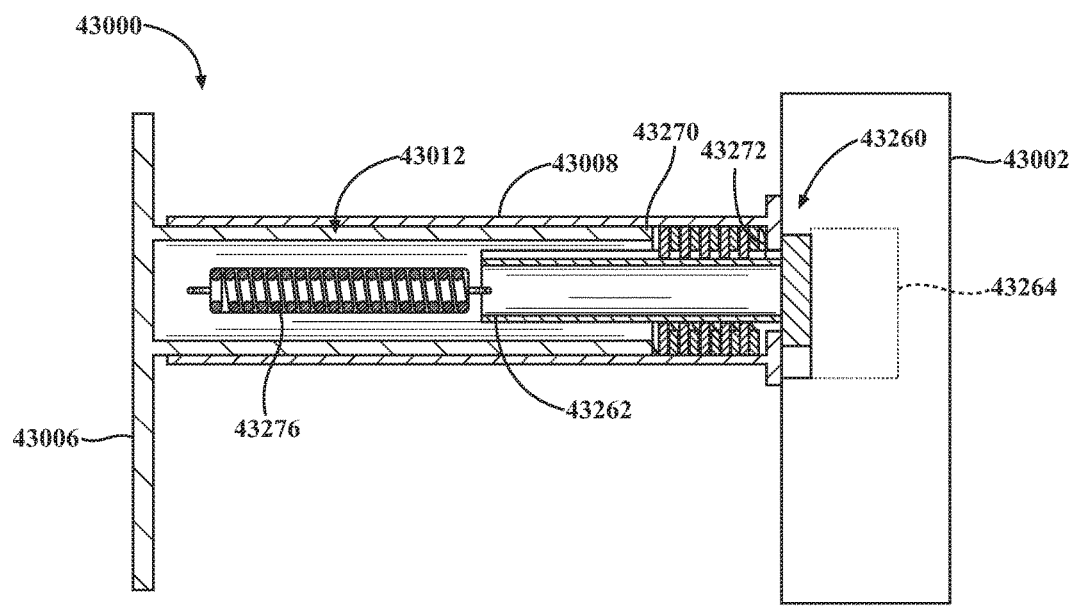
FIG. 43 is a top cross-sectional view illustration showing an extendable bumper system according to a twelfth example in a retracted position.
Figure 44:
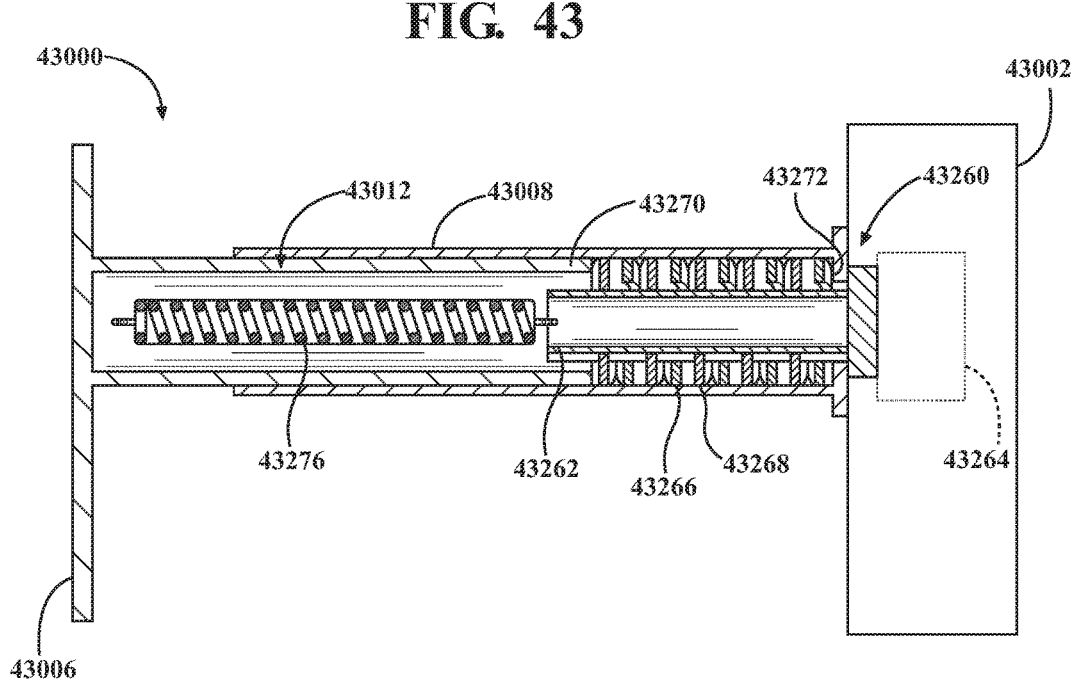
FIG. 44 is a top cross-sectional view illustration showing the extendable bumper system according to the twelfth example in an extended position.

FIGS. 43-44 show an extendable bumper system 43000. The extendable bumper system 43000 includes a bumper 43006 that is supported for movement with respect to a vehicle structure 43002 between a retracted position (FIG. 43) and an extended position (FIG. 44). The extendable bumper system 43000 includes a first side rail 43008 that is connected to the vehicle structure 43002, as well as a first extension portion 43012 that is connected to the bumper 43006. The first side rail 43008 and the first extension portion 43012 can each be tubular structures that are related to one another to allow extension and retraction by longitudinal sliding, such as by a telescopic relationship between the first side rail 43008 and the first extension portion 43012. In the illustrated example, the first side rail 43008 and the first extension portion 43012 is telescopically disposed within the first side rail 43008.

To cause movement of the extendable bumper system 43000 between the retracted and extended positions, the extendable bumper system 43000 includes an extension assembly 43260. The extension assembly 43260 includes a support portion 43262. The support portion 43262 can be a cylindrical member that is disposed within the first side rail 43008 and the first extension portion 43012. The support portion 43262 can be rotatably connected to the vehicle structure 43002, as well as to a rotational actuator 43264, such as an electric motor that rotates the support portion 43262 around its longitudinal axis in order to cause extension and retraction of the extendable bumper system 43000, as will be explained further herein.

The extension assembly 43260 includes an axial cam stack defined by a first plurality of cam discs 43266 and a second plurality of cam discs 43268. The first plurality of cam discs 43266 and the second plurality of cam discs 43268 each include waved discs that define crests and troughs. The first plurality of cam discs 43266 is restrained from rotating, such as by a splined connection with respect to the first side rail 43008. The second plurality of cam discs is connected to the support portion 43262, such as by a splined connection, for rotation in unison with the support portion 43262 in response to rotational force supplied by the rotational actuator 43264.

The first plurality of cam discs 43266 and the second plurality of cam discs 43268 define an axial cam stack that expands and contracts its axial dimension in response to rotation of the second plurality of cam discs 43268 with respect to the first plurality of cam discs 43266. The first and second pluralities of cam discs 43266, 43268 are captured between an end portion 43270 of the first extension portion 43012 and an end portion 43272 of the first side rail 43008. Thus, extension of the axial cam stack defined by the first and second pluralities of cam discs 43266, 43268 causes corresponding extension of the bumper 43006, as the first and second pluralities of cam discs 43266, 43268 engage the end portions 43270, 43272 of the first extension portion 43012 and the first side rail 43008. Extension of the axial cam stack is caused by alignment of the crests of the first pluralities of cam discs 43266 with the troughs of the second pluralities of cam discs 43268. Retraction of the axial dimension of the axial cam stack is caused by alignment of the crests of the first pluralities of cam discs 43266 with the crests of the second pluralities of cam discs 43268.

The extendable bumper system 43000 is moved from the retracted position to the extended position using the rotational actuator 43264 to rotate the support portion 43262, which misaligns the crests and troughs of the first and second pluralities of cam discs 43266, 43268 with respect to one another to lengthen the axial cam stack and thereby force the first extension portion 43012 away from the first side rail 43008. Movement of the extendable bumper system 43000 from the extended position to the retracted position is caused by an opposite rotation of the rotational actuator 43264 to shorten the axial cam stack defined by the first and second pluralities of cam discs 43266, 43268 and is assisted by a biasing means such as a tension spring 43276. In the illustrated implementation, the tension spring 43276 is connected to the first extension portion 43012 and to the support portion 43262, which urges the bumper 43006 toward the retracted position when the axial cam stack defined by the first and second pluralities of cam discs 43266, 43268 is shortened.

Figure 45:
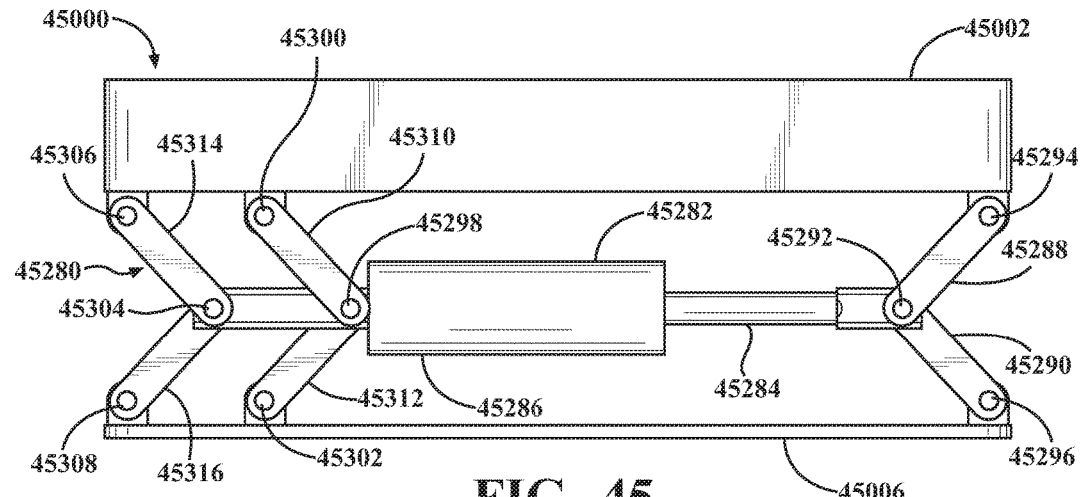
FIG. 45 is a top view illustration showing an extendable bumper system according to a thirteenth example in a retracted position.
Figure 46:
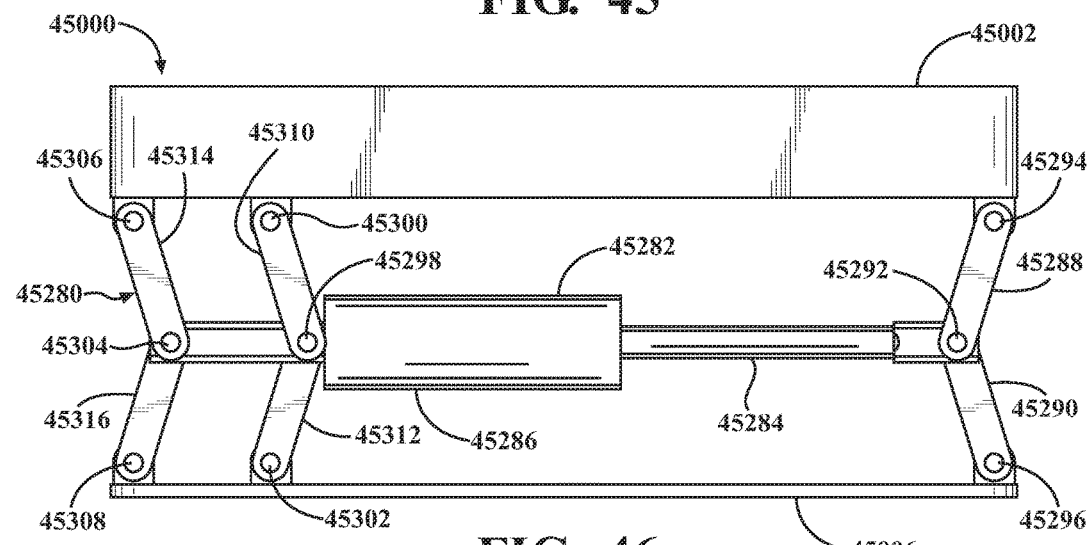
FIG. 46 is a top view illustration showing the extendable bumper system according to the thirteenth example in an extended position.
Figure 47:
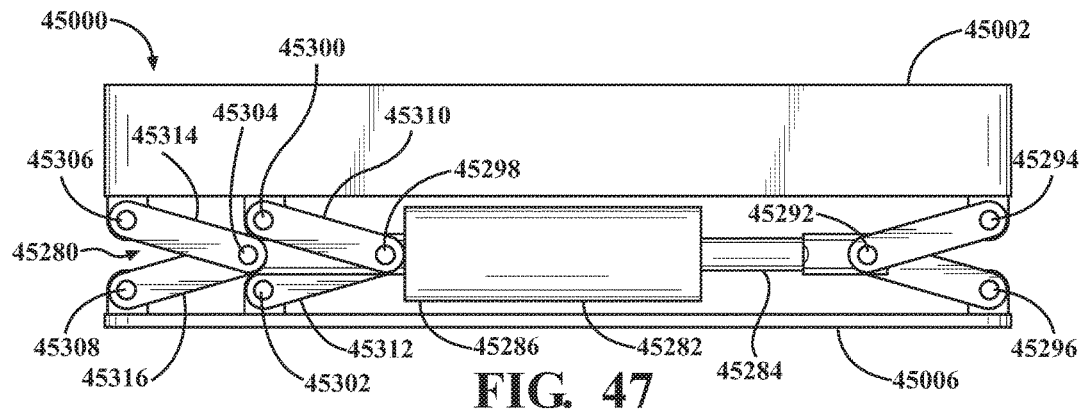
FIG. 47 is a top view illustration showing the extendable bumper system according to the thirteenth example in a collapsed condition.

FIGS. 45-47 show an extendable bumper system 45000. The extendable bumper system 45000 includes a bumper 45006 that is supported with respect to vehicle structure 45002 for movement between a retracted position (FIG. 45) and an extended position (FIG. 46).

The bumper 45006 is supported with respect to the vehicle structure 45002 by an extension assembly 45280. The extension assembly 45280 includes a linear actuator 45282. As an example, the linear actuator 45282 may be a fluid operated piston-cylinder combination, such as a hydraulic piston-cylinder combination or a pneumatic piston-cylinder combination. In the illustrated example, the linear actuator 45282 includes a first portion 45284 and a second portion 45286. For example, the first portion 45284 can be a piston rod, and the second portion 45286 can be a body portion of the cylinder. The first portion 45284 is connected to a first pivot arm 45288 and a second pivot arm 45290 at a first pivot joint 45292. The first pivot arm 45288 is connected to the vehicle structure by a second pivot joint 45294. The second pivot arm 45290 is connected to the bumper 45006 by a third pivot joint 45296. The second portion 45286 of the linear actuator 45282 is connected to a third pivot arm 45310 and a fourth pivot arm 45312 at a fourth pivot joint 45298. The third pivot arm 45310 is connected to the vehicle structure 45002 at a fifth pivot joint 45300. The fourth pivot arm 45312 is connected to the bumper 45006 at a sixth pivot joint 45302. The second portion 45286 of the linear actuator 45282 is also connected to a fifth pivot arm 45314 and a sixth pivot arm 45316 at a seventh pivot joint 45304. The fifth pivot arm 45314 is connected to the vehicle structure 45002 by an eighth pivot joint 45306. The sixth pivot arm 45316 is connected to the bumper 45006 by a ninth pivot joint 45308.

To move the extendable bumper system 45000 from the retracted position to the extended position, the linear actuator 45282 is lengthened by lateral extension of the first portion 45284 with respect to the second portion 45286. This causes a corresponding increase in the longitudinal extension of the pivot arms 45288, 45290, 45310, 45312, 45314, 45316. Movement from the extended position to the retracted position is caused by retracting the first portion 45284 of the linear actuator 45282 into the second portion 45286 in the transverse direction.

In the event of an impact, further longitudinal shortening of the pivot arms 45288, 45290, 45310, 45312, 45314, 45316 can be caused by further retracting the first portion 45284 of the linear actuator 45282 into the second portion 45286 relative to the retracted position. This further retraction of the second portion 45286 in the event of an impact can be performed at a controlled rate, such as by controlling the rate at which fluid is expelled from the linear actuator 45282 using means such as a bleeder valve in implementations where the linear actuator 45282 is a fluid operated piston-cylinder arrangement. Subsequent to an impact, the extendable bumper system 45000 is disposed in a crushed condition (FIG. 47).

Figure 48:
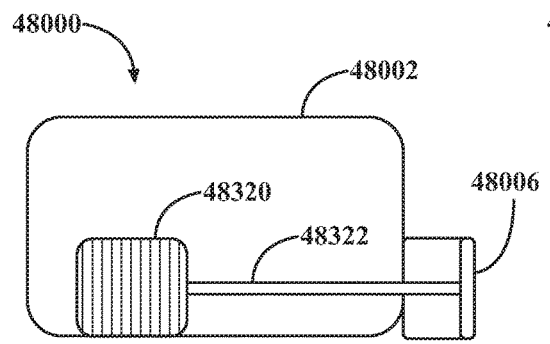
FIG. 48 is a side view illustration showing a bumper system according to a fourteenth example in a non-collapsed condition.
Figure 49:
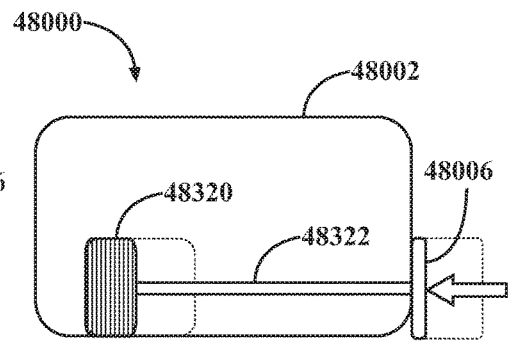
FIG. 49 is a side view illustration showing the bumper system according to the fourteenth example in a collapsed condition.

FIGS. 48-49 show a bumper system 48000. The bumper system 48000 includes a bumper 48006 that is supported with respect to a vehicle structure 48002. The bumper system 48000 includes a crush member 48320 that resists movement of the bumper 48006 from a non-collapsed condition (FIG. 48) to a collapsed condition (FIG. 49) in response to an impact, to allow absorption of energy by the crush member 48320. In particular, the crush member 48320 is disposed internal to the vehicle structure 48002, such as by location of the crush member 48320 in an internal space that is located inside the vehicle structure 48002. The crush member 48320 is connected to the bumper 48006 in a manner that allows transmission of force from the bumper 48006 to the crush member 48320. For example, the crush member 48320 may be connected to the bumper 48006 by a longitudinally extending connecting portion 48322, such as a rod or a beam. During an impact, the crushable member 48320 is able to crush by a distance that is similar to a distance between a front face of the bumper 48006 and the vehicle structure 48002. Thus, the bumper 48006 is able to collapse in a manner that allows it to travel the majority of the distance to the vehicle structure 48002, without being restrained from doing so by presence of an element, such as the crushable member 48320 in between the bumper 48006 and the vehicle structure 48002.

Figure 50:
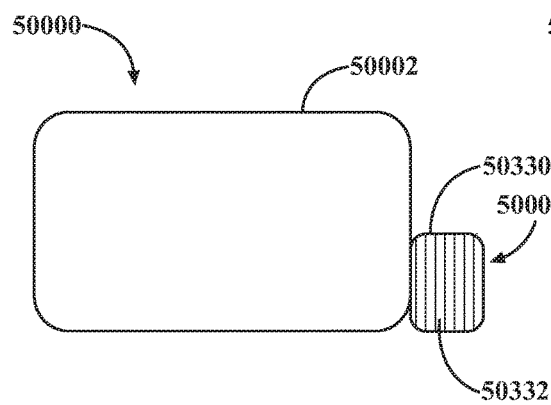
FIG. 50 is a side view illustration showing a bumper system according to a fifteenth example in a non-collapsed condition.
Figure 51:
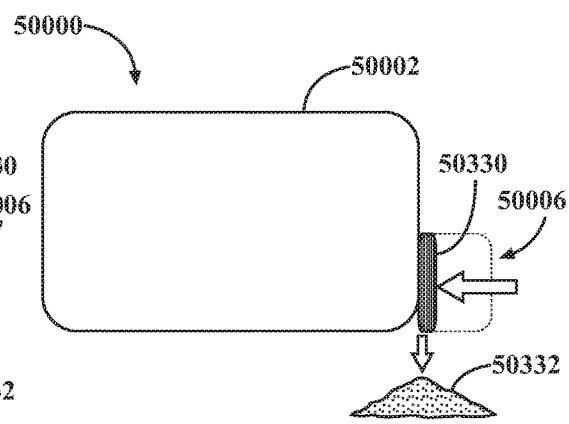
FIG. 51 is a side view illustration showing the bumper system according to the fifteenth example in a collapsed condition.

FIGS. 50-51 show a bumper system 50000 that includes a bumper 50006 that is supported with respect to a vehicle structure 50002. The bumper 50006 includes a crushable member 50330 that has a crush material 50332 disposed inside of it. The crushable member 50330 may be, for example, disposed inside the bumper 50006. The crush material 50332 is a material that can be expelled from the crushable member 50330. As examples, the crush material 50332 could be a powder, a liquid, a gas, or a granular material. Prior to an impact, the crushable member 50330 may be sealed. Initially, the bumper system 50000 is disposed in a non-collapsed condition (FIG. 50) in the event of an impact, the crushable member 50330 allows the crush material 50332 to be expelled from the interior of the crushable member 50330 such as by rupturing or by passing the material through a valve in response to the pressure applied to the crushable member 50330. The crush material 50332 can be expelled in a controlled manner to allow energy to be absorbed by the crushable member 50330, as it collapses as a result of the impact, and as a result of the impact and as the crush material 50332 is expelled from the crushable member 50330. Subsequent to the impact, the crushable member 50330 is collapsed to a minimum longitudinal length, which places the bumper system 50000 in a collapsed condition.

Figure 52:
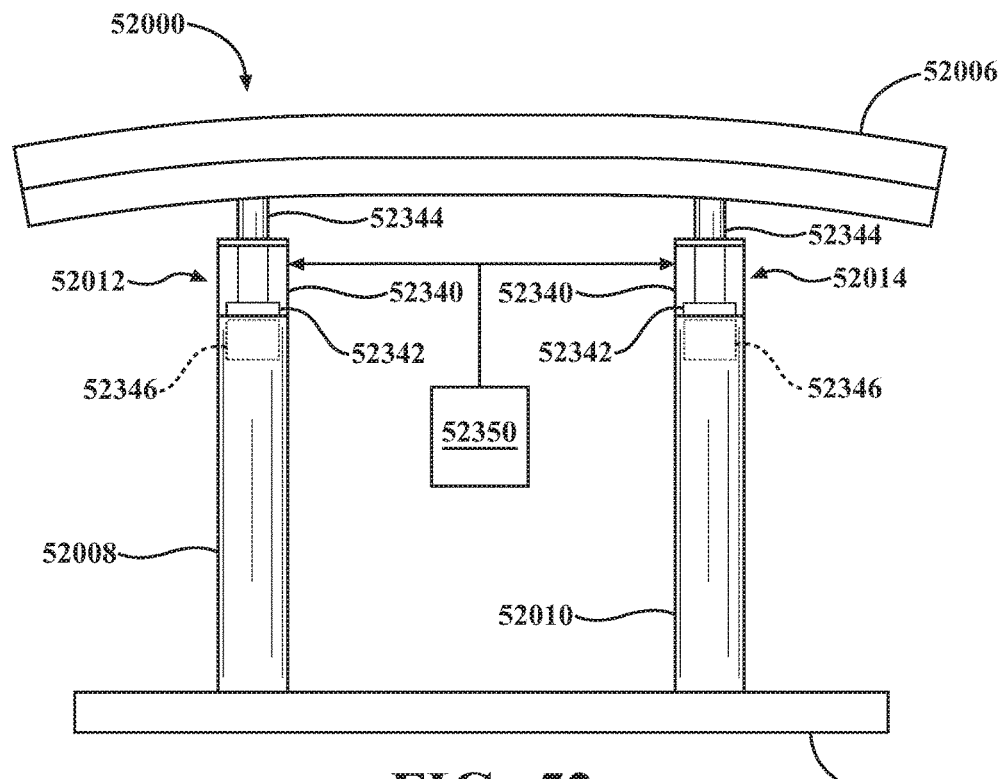
FIG. 52 is a top view illustration showing an extendable bumper system according to a sixteenth example in a retracted position.
Figure 53:
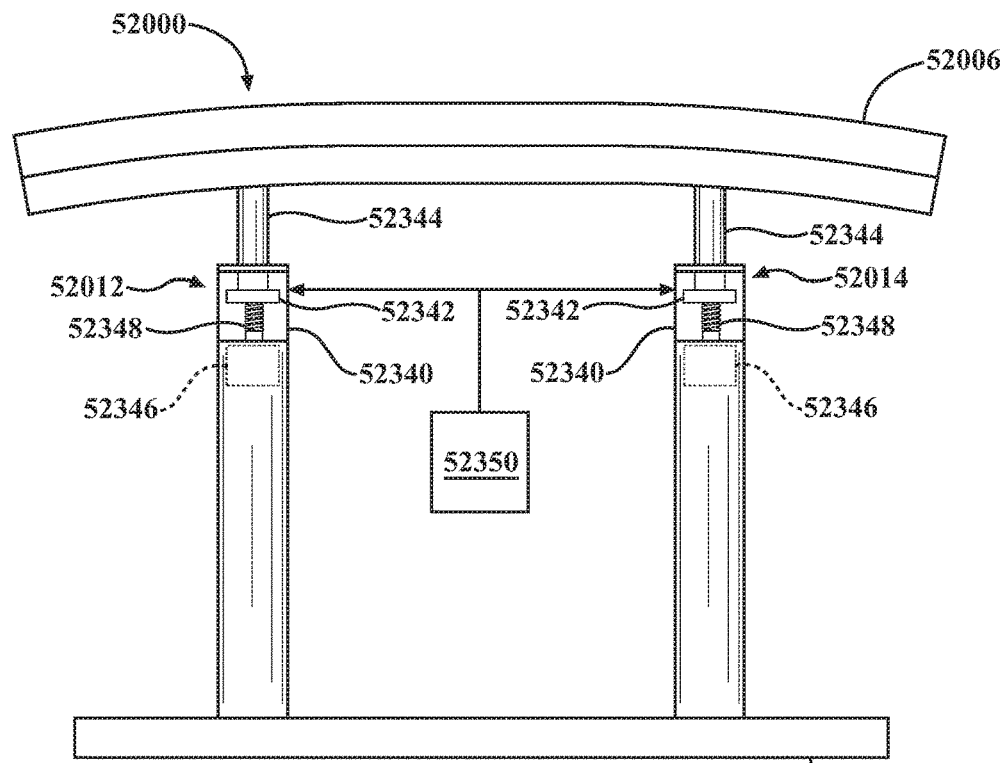
FIG. 53 is a top view illustration showing the extendable bumper system according to the sixteenth example in an extended position.

FIGS. 52-53 show an extendable bumper system 52000. The extendable bumper system 52000 includes a bumper

52006 that is supported for movement with respect to a vehicle structure 52002 between a retracted position (FIG. 52) and an extended position (FIG. 35). The extendable bumper system 52000 includes a first slide rail 52008, a second side rail 52010, a first extension portion 52012, and a second extension portion 52014. The first extension portion 52012 is movably connected to and supported by the first side rail 52008. The second extension portion 52014 is movably connected to and supported by the second side rail 52010. The first extension portion 52012 and the second extension portion 52014 are each connected to the bumper 52006.

The first and second extension portions 52012, 52014 each include a fluid operated cylinder 52340 such as hydraulic cylinder or a pneumatic cylinder. Each fluid operated cylinder 52340 is connected to a respective piston 52342, which is disposed therein. Each piston 52342 is connected to a respective piston rod 52344, which extends out of the respective cylinder 52340 and connects the respective piston rod 52344 to the bumper 52006.

In the retracted position, the pistons 52342 and piston rods 52344 of the first and second extension portions 52012, 52014 can be disposed within the respective cylinders 52340 to a maximum extent of retraction. The pistons 52342 can be held in place by locking mechanisms 52346. The locking mechanisms 52346 can be disposed, for example, within the first and second side rails 52008, 52010. As one example, the locking mechanisms 52346 can include mechanical structures that selectively engage the pistons 52342 to restrain motion of the pistons 52342. In one implementation, the locking mechanisms 52346 may be solenoid actuated pins that engage a portion of each of the cylinders 52340. In another implementation, locking mechanisms 52346 can include selectively operable electromagnets that can be activated to produce a magnetic attraction force that attracts the piston 52342 toward the locking mechanisms 52346.

The locking mechanisms 52346 hold the pistons 52342 in place against a biasing force applied by means such as compression springs 52348. Compression springs 52348 are examples of elements that can be used to urge the pistons 52342 toward the extended position. When the locking mechanisms 52346 are disengaged, the compression springs may urge the pistons 52342 and the piston rods 52344 toward the extended position, thereby moving the bumper 52006 with respect to the vehicle structure 52002 from the retracted position toward the extended position.

In order to move the bumper 52006 from the extended position toward the retracted position, the extendable bumper system 52006 includes a pressurized fluid source 52350. The pressurized fluid source 53250 is operable to supply pressurized fluid such as hydraulic fluid or air to the interior of the cylinders 52340 at a front area of the cylinders 52340 adjacent to where the piston rods 52344 exit in order to urge the pistons 52342 toward the locking mechanisms 52346 against the force applied by the compression springs 52348. Thus, by supplying fluid pressure to the interior of the cylinders 52340 using the pressurized fluid source 52350, the bumper 52006 is moved from the extended position toward the retracted position. When the bumper 52006 reaches the retracted position, the locking mechanisms 52346 are engaged to lock the position of the pistons 52342 and thereby maintain the bumper 52006 in the retracted position.

Figure 54:
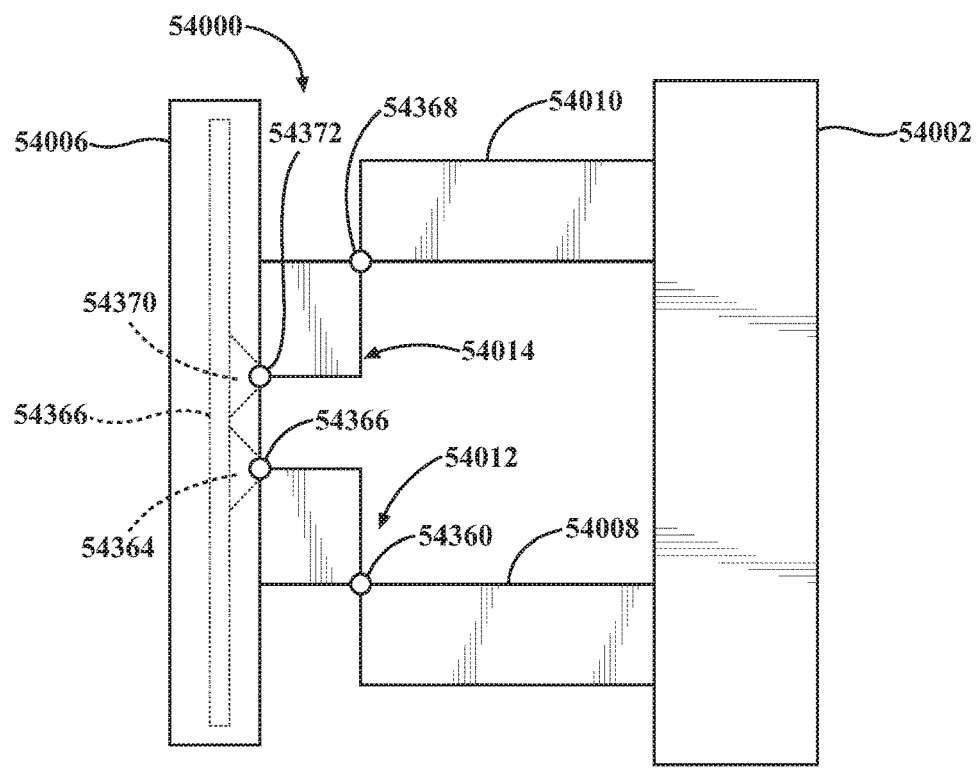
FIG. 54 is a top view illustration showing an extendable bumper system according to a seventeenth example in a retracted position.
Figure 55:
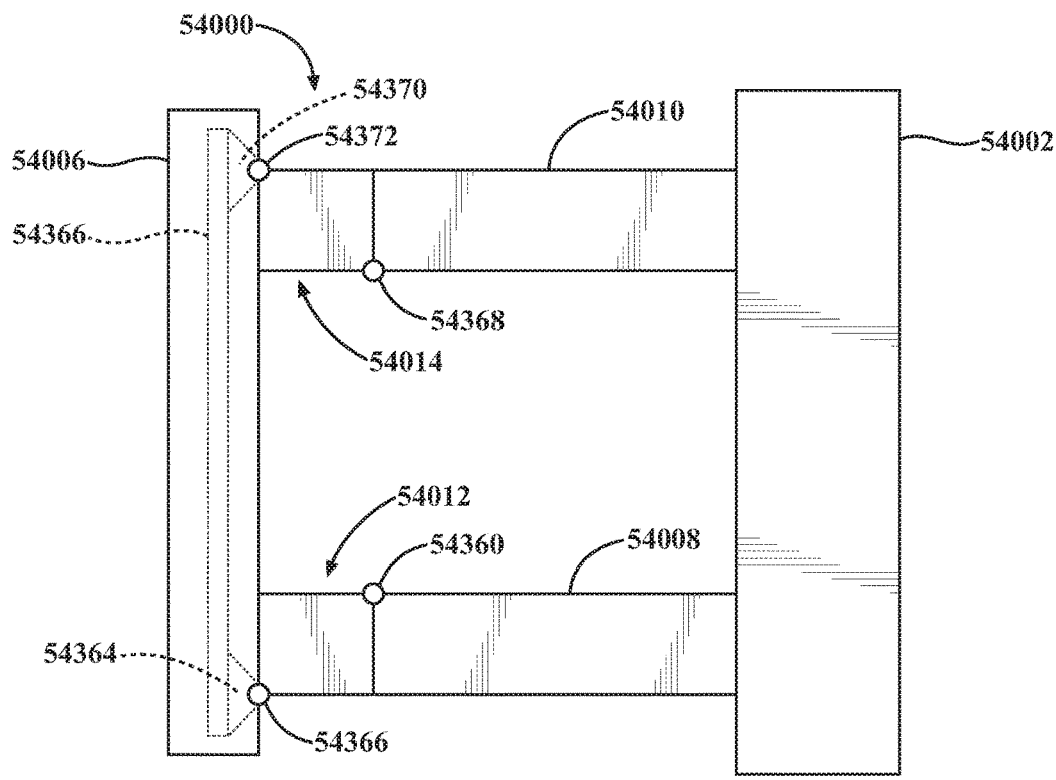
FIG. 55 is a top view illustration showing the extendable bumper system according to the seventeenth example in an extended position.

FIGS. 54-55 show an extendable bumper system 54000. The extendable bumper system 54000 includes a bumper 54006 that is movable between a retracted position (FIG. 54) and an extended position (FIG. 55) with respect to a vehicle structure 54002. The extendable bumper system 54000 includes a first side rail 54008, a second side rail 54010, a first extension portion 54012, and a second extension portion 54014. The first and second side rails 54008, 54010 are each rigidly connected to the vehicle structure 54002. The first extension portion 54012 is movably connected to the first side rail 54008 and the bumper 54006. The second extension portion 54014 is movably connected to the second side rail 54010 and to the bumper 54006.

The first extension portion 54012 is pivotally connected to the first side rail 54008 by a first pivot joint 54360. The first pivot joint 54360 can be located on an inboard side of the first side rail 54008. The first extension portion 54012 is connected to the bumper 54006 in a manner that allows the first extension portion 54012 to pivot and translate with respect to the bumper 54006. In the illustrated example, a second pivot joint 54362 pivotally connects the first extension portion 54012 to a sliding mount 54364. The sliding mount 54364 is able to translate laterally across the bumper 54006 during movement of the extendable bumper system 54000 between the retracted and extended positions. The sliding mount 54364 can be connected to the bumper 54006 by a mechanism that causes movement of the sliding mount 54364 with respect to the bumper 54006, such as a linear actuator 54366. For example, the linear actuator 54366 may include an electric motor and lead screw that is connected to the sliding mount 54364 in order to cause motion of the sliding mount 54364 in response to rotation of the lead screw by the electric motor.

The second extension portion 54014 can be pivotally mounted to the second side rail 54010 by a third pivot joint 54368. The second extension portion 54014 may be mounted to the bumper 54006 in a manner that allows pivoting and translation of the second extension portion 54014 with respect to the bumper 54006. In the illustrated example, the second extension portion 54014 is connected to the bumper by a sliding mount 54370 that is pivotally connected to the second extension portion 54014 by a fourth pivot joint 54372. The sliding mount 54370 is movably in a transverse direction of the bumper 54006 by the linear actuator 54366.

In the retracted position, the first and second extension portions 54012, 54014 are pivoted at angles with respect to the first and second side rails 54008, 54010. In the illustrated example, the first and second extension portions 54012, 54014 are each pivoted inboard with respect to the first and second side rails 54008, 54010 at an angle of approximately 90 degrees. To move from the retracted position to the extended position, the sliding mounts 54364, 54370 are moved laterally outward by the linear actuator 54366. As the sliding mounts 54364, 54370 move outward, the first and second extension portions 54012, 54014 pivot with respect to the bumper 54006 and the first and second side rails 54008, 54010. The extendable bumper system 54000 is disposed in the extended position when the first and second extension portions 54012, 54014 reach longitudinal alignment with respect to the first and second side rails 54008, 54010, respectively.

Movement of the extendable bumper system 54000 from the extended position to the retracted position is performed in a manner opposite that described for movement from the retracted position to the extended position.

Figure 56:
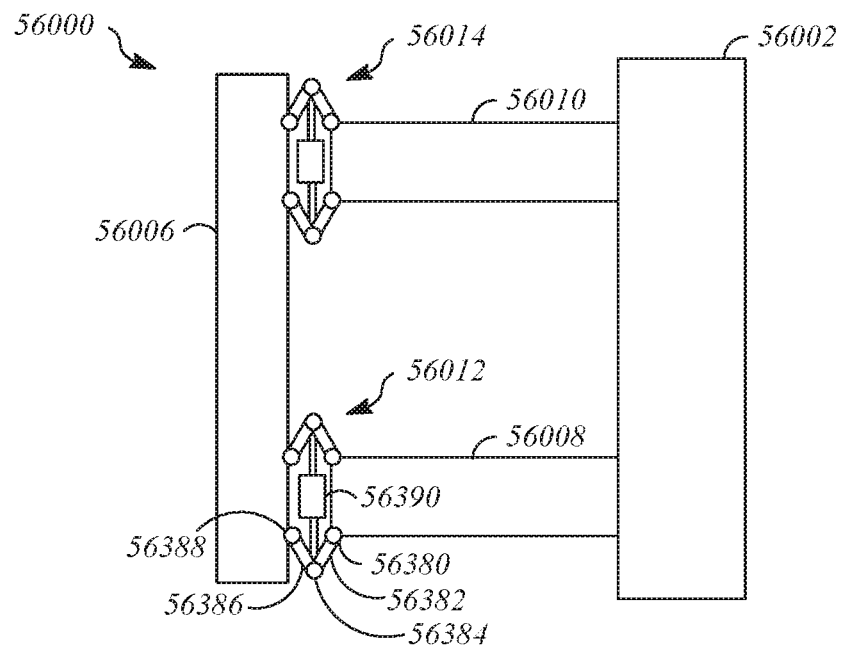
FIG. 56 is a top view illustration showing an extendable bumper system according to an eighteenth example in a retracted position.
Figure 57:
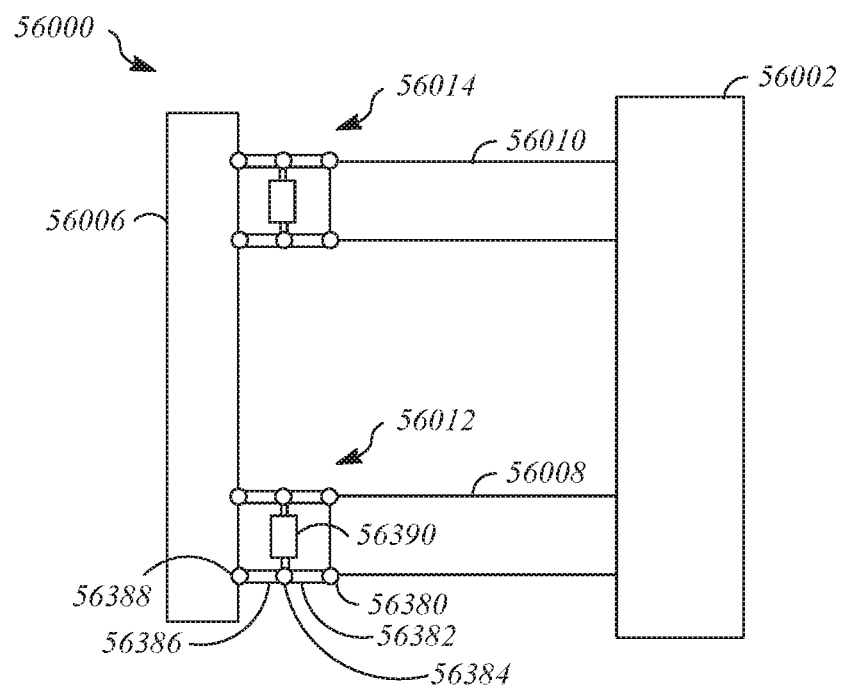
FIG. 57 is a top view illustration showing the extendable bumper system according to the eighteenth example in an extended position.

FIGS. 56-57 show an extendable bumper system 56000. The extendable bumper system 56000 includes a bumper 56006 that is movable between a retracted position (FIG. 56) and an extended position (FIG. 57) with respect to a vehicle structure 56002. The extendable bumper system 56000 includes a first side rail 56008, a second side rail 56010, a first extension portion 56012, and a second extension portion 56014. The first and second side rails 56008, 56010 are each rigidly connected to the vehicle structure 56002. The first extension portion 56012 is movably connected to the first side rail 56008 and the bumper 56006. The second extension portion 56014 is movably connected to the second side rail 56010 and to the bumper 56006.

The first extension portion 56012 and the second extension portion 56104 may be identical, as in the illustrated example, and will both be described with reference to the first extension portion 56012.

The first extension portion 56012 includes a pair of linkages that connect the first side rail 56008 to the bumper 56006. The linkages each include a first pivot joint 56380 that connects a first link 56382 to the first side rail 56012, a second pivot joint 56384 that connects the first link 56382 to a second link 56386, and a third pivot joint 56388 that connects the second link 56386 to the bumper 56006. A linear actuator such as a pneumatic or hydraulic cylinder 56390 extends between the linkages to cause extension and retraction, such as by being connected to the second pivot joints 56384. In the retracted position, the linkages are in a V-shaped configuration with the first links 56382 at angles with respect to the second links 56386. In the extended position, the linkages are substantially straight, with the first links 56382 in substantial longitudinal alignment with the second links 56386. In an impact, the cylinder 56390 can resist motion from the extended position to the retracted position to absorb some of the energy of the impact.

Figure 58:
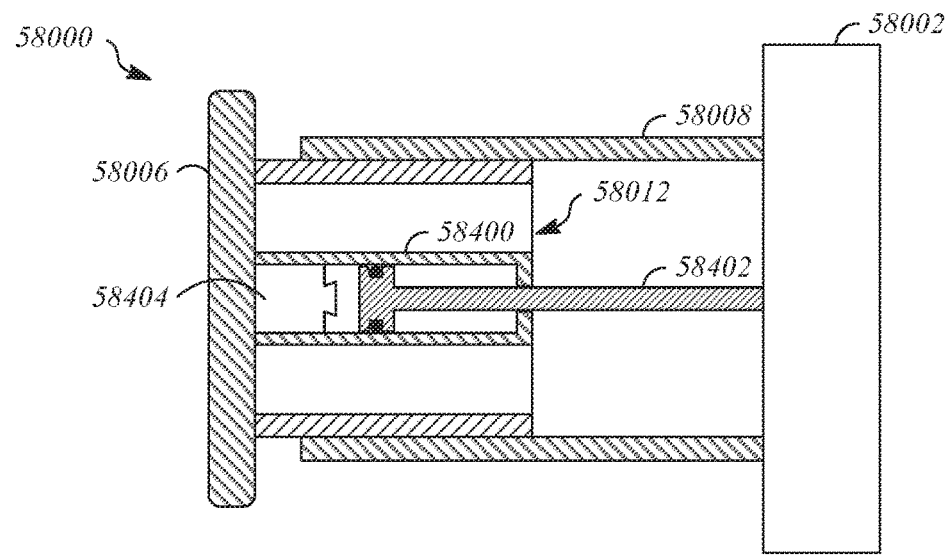
FIG. 58 is a side view illustration showing an extendable bumper system according to a nineteenth example in a retracted position.
Figure 59:
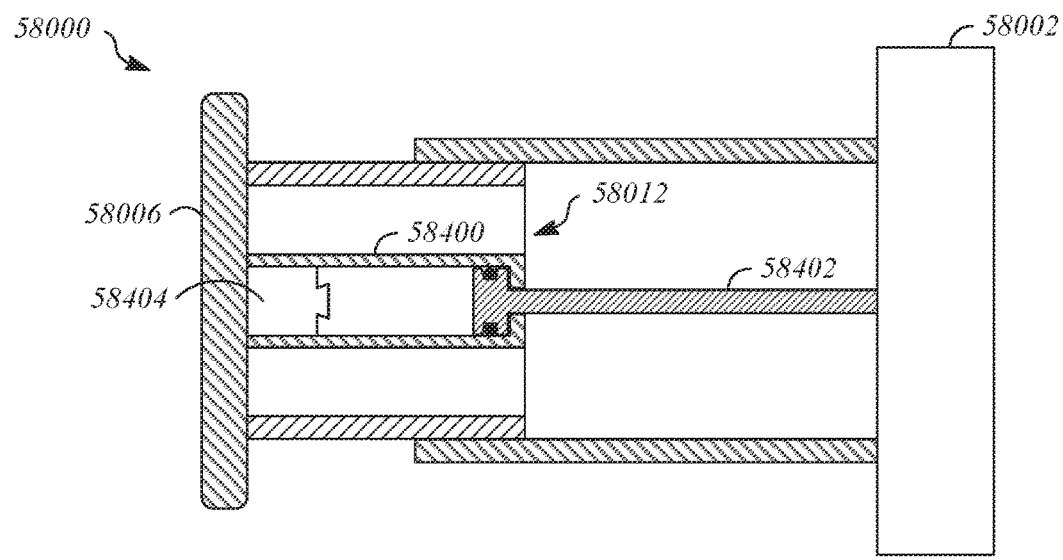
FIG. 59 is a side view illustration showing the extendable bumper system according to the nineteenth example in an extended position.

FIGS. 58-59 show an extendable bumper system 58000. The extendable bumper system 58000 includes a bumper 58006 that is movable between a retracted position (FIG. 58) and an extended position (FIG. 59) with respect to a vehicle structure 58002. The extendable bumper system 58000 includes a first side rail 58008 and a first extension portion 58012. The extendable bumper system 58000 may also include additional side rails and extension portions (not shown). The first side rail 58008 is rigidly connected to the vehicle structure 58002. The first extension portion 58012 is movably connected to the first side rail 58008.

In the illustrated implementation, the first extension portion 58012 is a beam that is telescopically related to the first side rail 58008 for movement between the retracted and extended positions. The bumper 58006 and the vehicle structure 58002 are also connected to an assembly that includes a cylinder 58400 and an associated piston 58402. A micro gas generator 58404 is operable to rapidly supply gas to the interior of the piston 58400 to cause movement from the retracted position to the extended position rapidly, such as over a time frame of less than 100 milliseconds and in some implementations over a time from of 5-15 milliseconds. This allows movement of the bumper 58006 to the extended position upon detection of an imminent impact. As an example, the micro gas generator may be a pyrotechnic device that generates gas by combustion. The extendable bumper system 58000 may also include a separate means for extension and retraction for situations other than an imminent impact.

Figure 60:
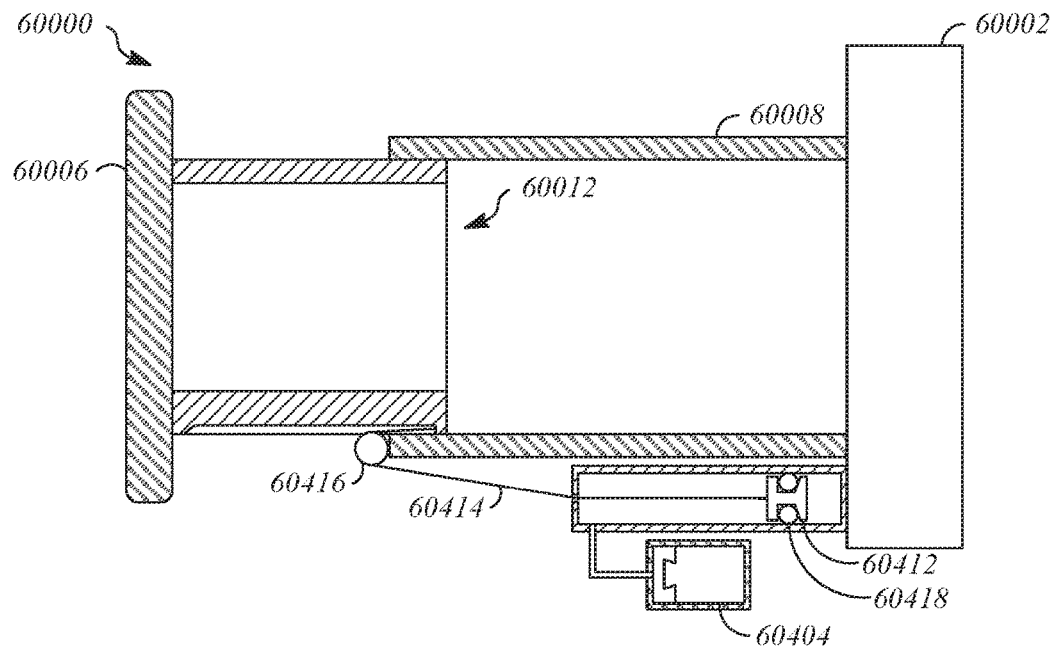
FIG. 60 is a side view illustration showing an extendable bumper system according to a twentieth example in an extended position.
Figure 61:
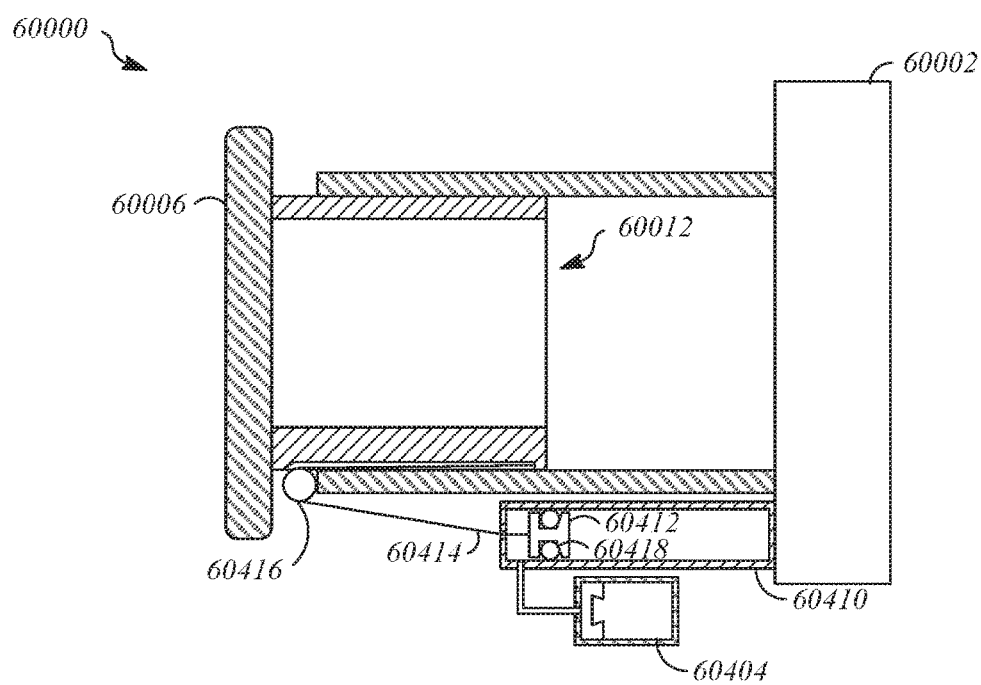
FIG. 61 is a side view illustration showing the extendable bumper system according to the eighteenth example in a retracted position.

FIGS. 60-61 show an extendable bumper system 60000. The extendable bumper system 60000 includes a bumper 60006 that is movable between an extended position (FIG. 60) and a retracted position (FIG. 61) with respect to a vehicle structure 60002. The extendable bumper system 60000 includes a first side rail 60008 and a first extension portion 60012. The extendable bumper system 60000 may also include additional side rails and extension portions (not shown). The first side rail 60008 is rigidly connected to the vehicle structure 60002. The first extension portion 60012 is movably connected to the first side rail 60008.

An assembly that includes a cylinder 60410 and a piston 60412 is operable to resist movement of the bumper 60006 from the extended position toward the retracted position. The cylinder 60410 may be fixed with respect to the vehicle structure 60002. In the illustrated implementation, the piston 60412 is connected to the extension portion 60012 by a wire 60414 and a pulley 60416.

The piston 60412 may be configured to allow motion of the bumper 60006 from the extended position to the retracted position with a predetermined degree of resistance in a first mode of operation. In a second mode of operation, means such as locking balls 60418 engage the cylinder 60410 to restrain motion of the piston 60412 with respect to the cylinder 60410 toward the retracted position, thereby allowing the first extension portion 60012 and the first side rail 60008 to crush without first moving to the retracted position, while deformation of the cylinder 60410 absorbs a portion of the impact.

The extendable bumper system 60000 may include an actuator to move the bumper 60006 from the retracted position to the extended position. As an example, a micro gas generator 60404 may be disposed within or fluidly connected to the cylinder 60410 in order to provide pressurized gas to the interior of the cylinder 60410 in response to a signal. The pressurized gas from the micro gas generator is operable to move the piston 60412 such that the bumper 60006 moves toward the extended position from the retracted position. The signal may be generated, as an example, in response to sensing a possible collision. Other types of actuators may be incorporated in the extendable bumper system 60000 including those described with respect to other implementations.

What is claimed is:

1. An apparatus, comprising:
   a vehicle structure;
   a bumper;
   an elongate structural member that is oriented in a longitudinal direction between the vehicle structure and the bumper and is able to crush longitudinally in response to application of force in the longitudinal direction;
   an extension portion that is able to crush longitudinally in response to application of force in the longitudinal direction, is connected to the elongate structural member such that the elongate structural member and the extension portion support the bumper with respect to the vehicle structure, and is operable to move the bumper between an extended position and a retracted position with respect to the vehicle structure to change a distance between the bumper and the vehicle structure; and
   a locking mechanism that engages an end portion of the elongate structural member and an end portion of the extension portion in the extended position to restrain relative movement of the elongate structural member and the extension portion.

2. The apparatus of claim 1, wherein the elongate structural member and the extension portion are longitudinally aligned in the extended position.

3. The apparatus of claim 1, wherein the extension portion pivots during movement between the extended position and the retracted position while the elongate structural member remains oriented in the longitudinal direction in the extended position and the retracted position.

4. The apparatus of claim 1, wherein the extension portion includes an extension block that is pivotally connected to the elongate structural member, the extension portion is longitudinally aligned with the elongate structural member in the extended position, and the elongate structural member remains oriented in the longitudinal direction in the extended position and the retracted position.

5. The apparatus of claim 1, wherein the extension portion is movable laterally relative to the elongate structural member.

6. The apparatus of claim 1, wherein the extension portion is laterally adjacent to the elongate structural member in the retracted position and the extension portion is longitudinally aligned with the elongate structural member in the extended position.

7. The apparatus of claim 1, wherein the locking mechanism includes a first locking structure, a second locking structure, and an actuator, wherein the first locking structure and the second locking structure are each connected to one of the end portion of the extension portion or the end portion of the elongate structural member, wherein the first locking structure includes radially outwardly extending projections, the second locking structure includes radially inwardly extending projections, and relative rotation of the first locking structure and the second locking structure by the actuator moves the locking mechanism between an unlocked position, in which the first locking structure is disengaged from the second locking structure and a locked position, first locking structure is engaged with the second locking structure.

8. The apparatus of claim 1, further comprising:
a scissor mechanism connected to the elongate structural member and the extension portion, the scissor mechanism including a first beam and a second beam that are arranged in an X-shaped configuration and are connected by a pivot joint; and
an actuator connected to the scissor mechanism to cause movement of the bumper between the extended position and the retracted position.

9. The apparatus of claim 1, further comprising:
a crank that causes the extension portion to pivot relative to the elongate structural member such that the extension portion is longitudinally aligned with the elongate structural member when the bumper is in the extended position while the elongate structural member remains oriented in the longitudinal direction in the extended position and the retracted position.

10. The apparatus of claim 1, further comprising:
an actuator assembly that extends between the vehicle structure and the bumper along an axis that extends in the longitudinal direction, wherein the actuator assembly is operable to move the bumper longitudinally with respect to the vehicle structure between the extend position and the retracted positions and is operable to pivot the extension portion around the axis such that the extension portion is longitudinally aligned with the elongate structural member in the extended position.

11. An apparatus, comprising:
a vehicle structure;
a bumper;
an elongate structural member that is oriented in a longitudinal direction between the vehicle structure and the bumper and is able to crush longitudinally in response to application of force in the longitudinal direction; and
an extension portion that is able to crush longitudinally in response to application of force in the longitudinal direction, is connected to the elongate structural member such that the elongate structural member and the extension portion support the bumper with respect to the vehicle structure, and is operable to move the bumper between an extended position and a retracted position with respect to the vehicle structure to change a distance between the bumper and the vehicle structure,
wherein the extension portion is longitudinally aligned with the elongate structural member in the extended position and the retracted position, the extension portion is disposed within a hollow interior of the elongate structural member in the retracted position, the extension portion is movable out of the hollow interior of the elongate structural member to define an intermediate position, and the extension portion is rotatable with respect to the elongate structural member to move from the intermediate position to the extended position, wherein rotation of the extension portion with respect to the elongate structural member allows engagement of end surfaces of the extension portion with end surfaces of the longitudinal structural member to restrain movement from the extended position toward the retracted position.

12. The apparatus of claim 1, wherein the extension portion includes a piston and a cylinder, wherein the cylinder is disposed within the elongate structural member and is operable to move the piston with respect to the cylinder to cause movement of the bumper between the extended position and the retracted position.

13. An apparatus, comprising:
a vehicle structure;
a bumper;
an elongate structural member that is able to crush longitudinally in response to application of force in a longitudinal direction; and
an extension portion that is able to crush longitudinally in response to application of force in the longitudinal direction, is connected to the elongate structural member such that the elongate structural member and the extension portion support the bumper with respect to the vehicle structure, and is operable to move the bumper between an extended position and a retracted position with respect to the vehicle structure to change a distance between the bumper and the vehicle structure;
an extension assembly that includes a first plurality of cam discs that are connected to the elongate structural member and a second plurality of cam discs that are connected to the extension portion wherein relative rotation of the first plurality of cam discs and the second plurality of cam discs causes movement of the bumper between the extended position and the retracted position; and
an actuator for causing relative rotation of the first plurality of cam discs and the second plurality of cam discs.

14. The apparatus of claim 13, wherein the first plurality of cam discs and the second plurality of cam discs each include waved discs that define crests and troughs.

15. The apparatus of claim 13, wherein the first plurality of cam discs rotates in unison with the elongate structural member and the second plurality of cam discs rotates in unison with the extension portion.

16. The apparatus of claim 13, wherein the first plurality of cam discs and the second plurality of cam discs define an axial cam stack that expands and contracts an axial dimension in response to rotation of the second plurality of cam discs with respect to the first plurality of cam discs.

17. The apparatus of claim 11, wherein the elongate structural member has a rectangular cross-section and the extension portion has a rectangular cross-section.

18. The apparatus of claim 11, wherein the elongate structural member and the extension portion each extend in the longitudinal direction in the extended position and the retracted position.

19. An apparatus, comprising:
a vehicle structure;
a bumper;
an elongate structural member that is oriented in a longitudinal direction between the vehicle structure and the bumper and is able to crush longitudinally in response to application of force in the longitudinal direction; and
an extension portion that is able to crush longitudinally in response to application of force in the longitudinal direction, is connected to the elongate structural member such that the elongate structural member and the extension portion support the bumper with respect to the vehicle structure, and is operable to move the bumper between an extended position and a retracted position with respect to the vehicle structure to change a distance between the bumper and the vehicle structure,
wherein the extension portion includes a first pivot arm that is pivotally connected to the elongate structural member, the extension portion includes a second pivot arm that is pivotally connected to the elongate structural member, and the extension portion moves the bumper between the extended position and the retracted position by pivoting of the first pivot arm and the second pivot arm relative to the elongate structure member while the elongate structural member remains oriented in the longitudinal direction.

20. The apparatus of claim 19, further comprising:
an actuator; and
a lead screw that is driven by the actuator and connected to the first pivot arm and the second pivot arm to cause pivoting of the first pivot arm and the second pivot arm.

* * * * *